US007883767B2

(12) United States Patent
Childs et al.

(10) Patent No.: US 7,883,767 B2
(45) Date of Patent: Feb. 8, 2011

(54) COMPOSITE MATERIAL COMPRISING LAYERED HYDROPHILIC COATINGS

(75) Inventors: Ronald F. Childs, Qualicum Beach (CA); Tapan K. Dey, Anushaktinagar (IN); Elena N. Komkova, Hamilton (CA)

(73) Assignee: McMaster University, Hamilton (CA)

( * ) Notice: Subject to any disclaimer, the term of this patent is extended or adjusted under 35 U.S.C. 154(b) by 155 days.

(21) Appl. No.: 11/238,642

(22) Filed: Sep. 29, 2005

(65) Prior Publication Data

US 2006/0121217 A1 Jun. 8, 2006

Related U.S. Application Data

(60) Provisional application No. 60/614,054, filed on Sep. 30, 2004.

(51) Int. Cl.
*B32B 3/26* (2006.01)
*B32B 3/06* (2006.01)
*B32B 5/14* (2006.01)
*B32B 9/00* (2006.01)
*B32B 27/00* (2006.01)

(52) U.S. Cl. .................. 428/304.4; 428/35.7; 428/36.5; 428/36.9; 428/36.91; 428/308.4; 428/309.9; 428/318.4; 428/319.3; 428/319.7; 428/319.9

(58) Field of Classification Search ................ 428/34.1, 428/35.2, 35.7, 36.5, 36.8, 411.1, 304.4, 428/306.6, 308.4, 309.9, 318.4, 319.3, 319.7, 428/319.9, 36.9, 36.91

See application file for complete search history.

(56) References Cited

U.S. PATENT DOCUMENTS

| 3,839,172 A | 10/1974 | Chapiro et al. |
| 4,277,344 A | 7/1981 | Cadotte |
| 4,280,970 A | 7/1981 | Kesting |
| 4,407,846 A | 10/1983 | Machi et al. |
| 4,473,474 A | 9/1984 | Ostreicher et al. |
| 4,506,035 A | 3/1985 | Barnett et al. |
| 4,512,896 A | 4/1985 | Gershoni |
| 4,605,685 A | 8/1986 | Momose et al. |

(Continued)

FOREIGN PATENT DOCUMENTS

CA 2118423 11/1993

(Continued)

OTHER PUBLICATIONS

Barton, A. F. M., In CRC Handbook of Solubility Parameters and Other Cohesion Parameters, 2nd Ed., CRC Press, Inc., Boca Raton, Florida, 1991.

(Continued)

*Primary Examiner*—Rena L Dye
*Assistant Examiner*—Walter B Aughenbaugh
(74) *Attorney, Agent, or Firm*—Seyfarth Shaw LLP

(57) ABSTRACT

A composite material comprising a support member that has a plurality of pores extending therethrough, a first polymer which durably coats the pores of the support member, the first polymer layer having both hydrophobic and hydrophilic properties, and a second polymer layer disposed on the surface of the first polymer layer, the second polymer being more hydrophilic than the first polymer layer. A process for preparing the composite material, and its use as a separation medium.

36 Claims, 2 Drawing Sheets

U.S. PATENT DOCUMENTS

| | | | |
|---|---|---|---|
| 4,618,533 | A | 10/1986 | Steuck et al. |
| 4,673,504 | A | 6/1987 | Ostreicher et al. |
| 4,845,132 | A | 7/1989 | Masuoka et al. |
| 4,990,252 | A | 2/1991 | Tomaschke et al. |
| 5,019,260 | A | 5/1991 | Gsell et al. |
| 5,084,173 | A | 1/1992 | Nitadori et al. |
| 5,094,895 | A * | 3/1992 | Branca et al. ............ 428/36.91 |
| 5,137,633 | A | 8/1992 | Wang |
| 5,180,788 | A | 1/1993 | Vroomans |
| 5,215,692 | A | 6/1993 | Hörl et al. |
| 5,277,915 | A | 1/1994 | Provonchee et al. |
| 5,310,809 | A | 5/1994 | Pabon et al. |
| 5,318,866 | A | 6/1994 | Degen et al. |
| 5,476,590 | A | 12/1995 | Brose et al. |
| 6,258,276 | B1 | 7/2001 | Mika et al. |
| 6,287,730 | B1 | 9/2001 | Callahan et al. |
| 6,306,491 | B1 * | 10/2001 | Kram et al. ............ 428/315.5 |
| 6,406,626 | B1 | 6/2002 | Murakami et al. |
| 2003/0107150 | A1 | 6/2003 | Hamanaka et al. |

FOREIGN PATENT DOCUMENTS

| | | |
|---|---|---|
| CA | 1325405 | 12/1993 |
| CA | 2497530 | 3/2004 |
| DE | 27 35 887 A1 | 2/1978 |
| EP | 0 498 414 A2 | 2/1992 |
| EP | 0 561 277 B1 | 9/1993 |
| EP | 0 981 172 A1 | 2/2000 |
| GB | 2 216 134 A | 10/1989 |
| JP | 56030442 | 3/1981 |
| JP | 59059207 | 4/1984 |
| JP | 61161103 | 7/1986 |
| JP | 64-038103 A | 8/1989 |
| JP | 04346825 A2 | 12/1992 |
| JP | 9075694 | 3/1997 |
| JP | 10028852 | 2/1998 |
| JP | 2002233739 | 8/2002 |
| WO | WO 95/15808 | 6/1995 |
| WO | WO 97/17129 | 5/1997 |
| WO | WO 97/18904 | 5/1997 |
| WO | WO 99/20378 | 4/1999 |
| WO | WO 02/087734 A1 | 11/2002 |
| WO | WO 03/008011 A1 | 1/2003 |
| WO | WO 03/008078 A2 | 1/2003 |
| WO | WO2004/022201 | 3/2004 |

OTHER PUBLICATIONS

Hoftyzer-Van Krevelen and Hoy, (Grulke, E. A. In Polymer Handbook, 4th Ed.; Brandrup, J., Immergut E. H., Grulke, E. A., Eds.; Wiley-Interscience: New York, 1999, Chapter VII, p. 675).

Nyström M. et al., Journal of Membrane Science, "Modification of polysulfone ultrafiltration membranes with UV irradiation and hydrophilicity increasing agents" (1991), vol. 60, p. 275-296.

Rabelo, D. et al., Polym. Bull., "Structure and properties of styrene-divinylbenzene copolymers" (1994) vol. 33, p. 479, 487 and 493.

Van Krevelen, D. W. In Properties of Polymers, 3rd Ed., Elsevier Scientific Publishing Company, New York, 1990, Chapter 7, p. 129-159.

Childs, R.F., et al., "The design of high performance, gel-filled nanofiltration membranes", New Insights into Membrane Science and Technology: Polymeric and Biofunctional Membranes, Edit D. Bhattacharayya and D. A. Butterfield, (2003) p. 353-376, Elsevier.

Dickson, J.M., et al., "Development of a coating technique for the internal structure of polypropylene microfiltration membranes", Journal of Membrane Science, (1998) p. 25-36, vol. 148, No. 1.

Durchschlag, H., et al., "Calculation of the partial volume of organic compounds and polymers", Progress in Colloid & Polymer Science, (1994) p. 20-39, vol. 94.

Kapur, V., et al., "Hydrodynamic permeability of hydrogels stabilized within porous membranes", Industrial and Engineering Chemistry Research, (1996) p. 3179-3185, vol. 35.

Mika, A.M., et al, "A new class of polyelectrolyte-filled microfiltration membranes with environmentally controlled porosity", J. Membr. Sci., (1995) p. 37-56, vol. 108.

Mika, A.M., et al., "Porous, polyelectrolyte-filled membranes: Effect of cross-linking on flux and separation", J. Memb. Sci., (1997) p. 81-92, vol. 135.

Mika, A.M., et al., "Calculation of the hydrodynamic permeability of gels and gel-filled microporous membranes", Industrial and Engineering Chemistry Research, (2001) p. 1694-1705, vol. 40.

Nakamae, K., et al., "Surface characterization of ethylene-vinyl alcohol copolymer membranes prepared under various conditions", Journal of Membrane Science, (1992) p. 163-170, vol. 75.

Pandey, A.K., et al., "Formation of Pore-Filled Ion-Exchange Membranes with in-situ Crosslinking: Poly(vinylbenzyl ammonium salt)-Filled Membranes", J. Polymer Sci. Part A, Polymer Chem., (2001) p. 807-820, vol. 39.

Shun, C-T., et al., "The effect of surface properties of EVAL membranes on the inflammatory response", Materials Science and Engineering C, (2000) p. 75-83, vol. 13.

Young, T-H., et al., "Effect of solvent evaporatoin on the formation of asymmetric and symmetric membranes with crystallizable EVAL polymer", Journal of Membrane Science, (2000) p. 111-120, vol. 164.

Young, T-H., et al., "Preparation of EVAL membranes with smooth and particulate morphologies for neuronal culture", Biomaterials, (2001) p. 1771-1777, vol. 22.

English Translation of JP 64-038103 A (Terumo Corp.) Aug. 2, 1989 (also cited in Jul. 29, 2010 IDS).

* cited by examiner

COMPOSITE MATERIAL COMPRISING LAYERED HYDROPHILIC COATINGS

CROSS-REFERENCE TO RELATED APPLICATIONS

This application claims the benefit of U.S. Provisional Patent Application No. 60/614,054, filed Sep. 30, 2004, which is incorporated herein by reference.

FIELD OF THE INVENTION

This invention relates to composite materials comprising layered hydrophilic coatings, to a process for their preparation and to their use as a separation medium.

BACKGROUND OF THE INVENTION

It is well known that reducing the hydrophobicity of a membrane is advantageous, as it reduces the fouling tendencies of the membrane. This naturally leads to a problem, as the least expensive and most stable membrane forming materials are polymers that are quite hydrophobic. There is also an advantage in making a membrane that is hydrophilic and therefore easily wettable with water, as this makes use of the membrane simpler and obviates the need for wetting solvents.

To decrease the hydrophobicity inherent to most polymeric membrane materials, it is known either to chemically modify the surface and pore-walls of a support member or, alternatively, to coat the walls of the pores in the support with a hydrophilic layer, the layer usually being polymeric in nature. The coated hydrophilic layer improves the affinity of the composite material towards water, increasing its wettability and, in some cases, making the membrane completely wettable by water.

Early efforts in the art to adhere the hydrophilic layer to the support included activating the walls of the pores in the support (for example with a plasma treatment) such that the coating is chemically attached to the pore-walls [Nystrom M. et al., Journal of Composite material Science. 60(1991)275-296]. These coatings could also be made by polymerizing a mixture of monomers within the support member to be coated under conditions that the thus formed polymer is grafted to the walls of the substrate. Under certain conditions where there is no crosslinking or low degrees of crosslinking of hydrophilic and particularly charged grafted polymers, the grafted layer can become hydrated and expand in thickness to essentially fill the pores of the substrate. Such composite materials were found to be very hydrophilic and readily wet with water.

A further advance in the art was made when it was discovered that formation of a crosslinked polymer can be used as a surface coating which has a superior combination of properties, including heat stable biomolecule resistance adsorptive properties, resistance to strong alkaline solutions, and low levels of extractable matter [Charkoudian J. and Soice N. P. WO 02/087734 A1].

BRIEF SUMMARY OF THE INVENTION

It has now been discovered that it is possible to apply two or more consecutive pore-coating layers to a porous support to achieve very hydrophilic composite materials. The composite materials of the invention are achieved by applying a first layer to the pores of a support member, the first layer comprising a polymeric material that exhibits both a hydrophobic character, for favorable interactions with the pore surface, and a hydrophilic character, for favorable interactions with a second layer. The second layer must be able to bind or interact with the hydrophilic moieties of the first layer, but it can be much more hydrophilic than the first layer.

In one aspect, the present invention provides a composite material comprising:
a) a support member that has a plurality of pores extending therethrough,
b) a first polymer layer which durably coats the pores of the support member, the first polymer layer having both hydrophobic and hydrophilic properties, and
c) a second polymer layer which durably coats the surface of the first polymer layer, the second polymer being more hydrophilic than the first polymer layer.

In another aspect, the present invention provides a process for preparing a composite material comprising the steps of:
(a) coating the pore-walls of a porous support member with a first polymer having both hydrophobic and hydrophilic properties to form a first polymer layer,
(b) coating said first polymer layer with a second polymer that is more hydrophilic than said first polymer, to form a second polymer layer.

In a further aspect, the present invention provides a method for removing a material from an solution, which solution is preferably aqueous, the method comprising passing a material-containing aqueous solution through a composite material as described herein.

In still another aspect, the present invention provides a filtering apparatus comprising a composite material as described herein.

By "coats the pores" and "coats the surface" is meant that the void volume within the pores of the support member is not fully occupied by the polymer layers, and that a liquid passing through the composite material will flow in proximity of the polymer layers but not necessarily through the layers, although some liquid may pass through the polymer layers.

By "durably coats" is meant that the polymer layers are substantially retained within the pores of the support member when water or an aqueous solution is passed through the composite material. Preferably, less than one percent by weight of the polymer in the polymer layers is lost when the composite material is submerged in water for 30 days.

DESCRIPTION OF THE FIGURES

Embodiments of the invention will be discussed with reference to the following Figures.

DETAILED DESCRIPTION OF THE INVENTION

General Characteristics

Figure 1A:
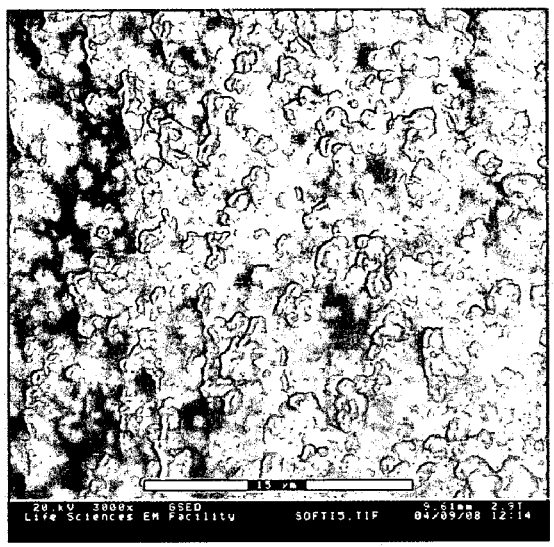
FIG. 1 shows an environmental scanning electron microscopy (ESEM) image of an poly(ethylene-co-vinyl alcohol) (EVAL) gel formed by precipitation (FIG. 1a) and evaporation (FIG. 1b).

The present invention relates to a composite material comprising a porous support member and a hydrophilic polymer layer (referred to herein as the second polymer layer), between which is present a polymer layer having balanced hydrophobic and hydrophilic properties (referred to herein as the first polymer layer) which promotes adherence of the hydrophilic polymer to the support member. The presence of the first polymer layer promotes adherence in those embodiments where the support member is hydrophobic and the second polymer layer is very hydrophilic, as omission of the first polymer layer could lead to very weak interactions, or even repulsion, between the support member and the second polymer layer.

Composition of the First Polymer Layer

As mentioned above, the first polymer layer comprises a polymer with balanced hydrophobic and hydrophilic properties. The first layer is selected such that it has enough hydrophobic character to have an affinity towards a hydrophobic support member, while at the same time its hydrophilic nature helps bind the hydrophilic second layer. While the first layer has an affinity towards the support member, there is preferably no covalent bonding between the first layer and the support member.

By "balanced hydrophobic and hydrophilic properties" is meant that the polymer possesses both hydrophobic and hydrophilic groups. The hydrocarbon backbone of the polymer contributes to the hydrophobic properties and functional groups, such as e.g. alcohols, sulfonic acid, and quaternary ammonium groups, contribute to the hydrophilic properties, of the polymer. The number of these groups present in the polymer backbone relate to the degree of substitution, which can be defined as a ratio of the number of functional group to the total number of available sites for substitution in the polymer backbone. In one embodiment, the "balanced hydrophobic and hydrophilic property" is attained through a degree of substitution in the range of from about 40% to about 90%, preferably in the range of from about 50% to about 80%, or more preferably in the range of from about 50% to about 70%. In some embodiments, the degree of substitution value necessary to attain a balanced hydrophobic/hydrophilic property will also be influenced by the nature of the hydrophilic substituents, as some substituents contribute a more significant hydrophilic character to the polymer.

Preferably, the first polymer layer comprises a gel polymer. A gel is a polymer network swollen in a liquid medium. The swelling liquid prevents the polymer network from collapsing and the network, in turn, retains the liquid. In order to be considered a gel polymer, a polymer must, for a specific liquid, be substantially insoluble but swellable. By "substantially insoluble but swellable" is meant that the polymer which forms the gel polymer is poorly soluble in the specific liquid, while still retaining enough solubility to display an increased volume when contacted with the liquid.

In the present invention, a gel polymer comprising a first polymer layer should be poorly soluble but swellable in water or aqueous solutions. Preferably, the monomer or polymer solution used to prepare the first polymer layer has good film-forming properties, which leads to a more uniform distribution of polymer and layer thickness.

The thickness of the first polymer layer can be regulated by controlling the amount and nature of the incorporated polymer. Preferably, the thickness of the first polymer layer is from 0.001 μm to 0.1 μm. More preferably, the thickness is from 0.005 μm to 0.01 μm. It is also preferred that the coating be evenly distributed over the surfaces of the support member.

The gel polymer forming the first polymer layer preferably has a molecular weight of from 5,000 to 500,000 g/mol, more preferably of from 10,000 to 100,000 g/mol. However, these ranges for molecular weight of the gel polymer are not meant to be limiting, as the molecular weight will be dictated by the nature of the support member, the nature of the gel polymer and the nature of the solvent being passed through the composite material. As long as the gel polymer meets the requirement that it be substantially insoluble but swellable in the solvent being passed through the composite material, it is to be considered part of the present invention. Preferably, the gel polymer is homogeneous or microheterogeneous.

Crosslinked First Polymer Layer

In one embodiment, the first polymer layer comprises a crosslinked gel polymer. Crosslinked gels are typically obtained by polymerization of a monomer and a polyfunctional compound (a crosslinker), or by crosslinking a crosslinkable polymer, in a solvent which is a good solvent for the formed polymer network and which swells the polymer network. The polymer chains in such a network can be assumed to be uniformly distributed throughout the whole volume of the network and the average distance between the chains, known as mesh size, is determined by the crosslinking density.

Crosslinking of the polymer that forms the first polymer layer can be initiated thermally or by irradiation, or it can be done chemically, for example by the addition of an acid catalyst. Crosslinking of the monomer or polymer that forms the gel can be carried out prior to the deposition of a second polymer layer, or crosslinking of the first polymer layer can be carried out simultaneously with the crosslinking of the monomer or polymer that forms the second polymer layer.

Examples of polymers that can form a crosslinked first layer include sulfonated poly(ether-ether-ketone) (S-PEEK) and polyvinyl alcohol (PVA), which polymers can be thermally crosslinked.

Non-crosslinked First Polymer Layer

In another embodiment, the first polymer layer comprises a non-crosslinked gel polymer. By "non-crosslinked gel polymer" is meant that different strands of the polymer are not interconnected by covalent bonds. In such cases, crosslinking of the polymer strands is circumvented by using a gel polymer where the required polymer-polymer interactions are achieved through weaker interactions, such as hydrogen bonding. In such a system, the gel remains stable, even when subjected to liquid flow.

Non-crosslinked gel layers can be prepared, for example, by an evaporation process or a precipitation process:

In the evaporation process, a polymer having the required balance of hydrophobic and hydrophilic properties is dissolved in a solvent, the solution prepared is inserted within the pores of the support member, and the solvent is then evaporated, leaving behind a coating of the polymer. The evaporation process can be utilised to prepare a polymer coating from any polymer that has the required balance of hydrophobic and hydrophilic properties, as long as a suitable solvent can be found in which the polymer has good film-forming qualities. The solvent should be able to dissolve the polymer and be evaporated at a temperature and pressure that do not adversely affect the support member or the polymer being deposited.

In the precipitation process, a polymer having the required balance of hydrophobic and hydrophilic properties is dissolved in a solvent, the solution thus prepared is introduced into the pores of the support member, and water is introduced into the pores of the support member to precipitate out the polymer in the form of a coating. The expression "precipitate out the polymer" refers to the process by which polymer constituting the dispersed (discontinuous) phase in a polymer solution inverts into a continuous phase of a swollen macromolecular network or gel.

The requirement that the non-crosslinked gel be substantially insoluble but swellable can be met by choosing monomers or polymers that have a relative balance between water-insolubility and water swellability. This relative balance can be measured through a three-dimensional cohesion parameter, $\delta_t$, A which is a relationship between solvent and polymer properties (Rabelo, D.; Coutinho, F. M. B. *Polym. Bull.* (1994), 33, 479.; Rabelo, D.; Coutinho, F. M. B. *Polym. Bull.* (1994), 33, 487.; Rabelo, D.; Coutinho, F. M. B. *Polym. Bull.* (1994), 33, 493). The three-dimensional cohesion parameter considers the contributions from dispersive, $\delta_d$, dipolar, $\delta_p$, and hydrogen bonding, $\delta_h$, interactions, according to equation:

$$\delta_t^2 = \delta_d^2 + \delta_p^2 + \delta_h^2$$

In a three-dimensional diagram the solvent and polymer can be represented by two points, and the solvent-polymer affinity can be described by the distance $d_0$ between these two points (Rabelo, D.; Coutinho, F. M. B. *Polym. Bull.* (1994), 33, 479):

$$d_0^2 = 4(\delta_{d1}-\delta_{d2})^2 + (\delta_{p1}-\delta_{p2})^2 + (\delta_{h1}-\delta_{h2})^2$$

The indices 1 and 2 represent the solvent and polymer, respectively.

Many of the cohesion parameters are tabulated in the literature (Barton A. F. M. In *CRC Handbook of Solubility Parameters and Other Cohesion Parameters*, 2nd ed.; CRC Press: Boca Raton, Fla., 1991). Those parameters that are not available can be estimated using a group contribution method according to Hoftyzer-Van Krevelen and Hoy (Grulke, E. A. In *Polymer Handbook*, 4th ed.; Brandrup, J., Immergut E. H., Grulke, E. A., Eds.; Wiley-Interscience: New York, 1999; Chapter VII, p 675.; Van Krevelen. D. W. In *Properties of Polymers*, 3rd ed.; Elsevier: New York, 1990; Chapter 7, p 189). In case of multifunctional polymers, the average cohesion parameters of n contributing groups can be calculated according to the following equation (Rabelo, D.; Coutinho, F. M. B. *Polym. Bull.* (1994), 33, 487):

$$\delta_i = \phi_1\delta_{1i} + \phi_2\delta_{2i} + \ldots \phi_n\delta_{ni}$$

whereas $\phi$ represents the volume fractions, and the index i, the type of dispersive interaction (d, p, and h).

The literature (Rabelo, D.; Coutinho, F. M. B. *Polym. Bull.* (1994), 33, 479) defines good solvents with $d_0<10.0$, intermediate solvents with $10.0<d_0<12.7$, and poor solvents with $d_0>12.7$.

For non-crosslinked gel polymers that are water insoluble but water swellable, the affinity between the gel polymer and water is depicted by the symbol $d_0$ ($H_2O$), which represents an affinity parameter, as described above, where the solvent is water. Preferably, the non-crosslinked gel that forms the first layer has a $d_0$ ($H_2O$) value of from 12 to 40, and more preferably, from 12 to 25. For water insoluble but water swellable gel polymers, the balance between water-insolubility and water swellability of the gel polymer can be achieved in various polymers by choosing appropriate monomers or co-monomers. In some instances, the sought after balance is achieved by using one or more monomers (co-monomers) which have a weak interaction with water, such as neutral monomers that have strong dipole moments or an ability to form hydrogen bonds. Neutral monomers bearing amide groups fall within this category. In other instances, a co-monomer having a hydrophobic character can be combined with a hydrophilic monomer, such as a charged monomer, to obtain a polymer that achieves the required balance of water insolubility and water swellability.

Examples of gel polymers include cellulose derivatives such as cellulose acetate, cellulose acetate butyrate, cellulose acetate propionate, 2-hydroxyethyl cellulose and ethyl cellulose. Further examples of gel polymers include polyesters such as poly(ethylene adipate), polyethylene glycol terephthalate, poly(L-lactide), poly(DL-lactide) and poly(DL-lactide-co-glycolide), polyamides such as poly(hexamethyleneadipamide) (Nylon 6/6) and poly (hexamethylenesebacamide) (Nylon 6/10), polyacrylates such as poly(2-hydroxyethyl methacrylate) and poly(2-hydroxypropyl methacrylate), poly(ethylene-co-vinyl alcohol) (EVAL) (which can have, for example, an ethylene content of from about 27 to about 44 mol-%), poly(ethylene-co-allyl alcohol), polyhydroxystyrene (poly(4-vinylphenol), and poly (vinyl alcohol) 40% hydrolyzed (Mowiol 40-88). Still further examples of gel polymers include water-insoluble, partially charged polymers such as sulfonated poly(ether-ether-ketone) (S-PEEK, <86% sulfonation), sulfonated poly(phenylene oxide) (S-PPO, <70% sulfonation) (e.g. sulfonated poly(2,6-phenylene-p-oxide), sulfonated polysulfone (S-PS; <70% sulfonation), sulfonated poly(ether sulfone)(SPES; <70% sulfonation), sulfonated polystyrene (SPSt; <70% sulfonation), aminated polysulfone (<70% amination), aminated poly(phenylene oxide) (Q-PPO; <70% amination), aminated poly(vinylbenzyl chloride) (APVB; <70% amination), partially protonated or alkylated poly(4-vintlpyridine) (Q-P4VP; <30% protonation or alkylation), copolymers of neutral and charged monomers, and random copolymers of hydrophilic and hydrophobic monomers.

The water-insolubility/water swellability balance of certain cellulose derivatives, such as cellulose acetate, can be controlled through the degree of acetylation of the polymer. In some instances, a degree of acetylation of from about 29 to about 61 wt-% is preferred. Similarly, the water-insolubility/water swellability balance of other polymers is controlled by adjusting the amount of sulfanation or amination in the polymer. The amount of amination of a polymer is dependent on the number of quartenized amine groups in the polymer.

The random copolymers of hydrophilic and hydrophobic monomers can be prepared, for example, by radical polymerization of one or more hydrophobic monomers with one or more hydrophilic monomers.

Examples of hydrophobic monomers include n-hexyl acrylate, n-heptyl methacrylate, 1-hexadecyl methacrylate, methyl methacrylate, styrene, 2,3, or 4-methylstyrene, n-myristyl acrylate,N-tert-butylacrylamide, N-(n-octadecyl) acrylamide, N-tert-octylacrylamide, n-octyl methacrylate, n-propyl acrylate, iso-propyl methacrylate, n-propyl methacrylate, stearyl acrylate, 3,3,5-trimethylcyclohexyl methacrylate, undecyl acrylate, undecyl methacrylate, vinyl butyrate, vinyl laurate, vinyl octadecylether, vinyl iso-octyl ether, vinyl stearate, tert-amyl methacrylate, N-benzylmethacrylamide, iso, sec, tert or n-butyl(meth)acrylate, N-cyclohexylacrylamide, cyclohexyl (meth)acrylate, n- or iso-decyl (meth)acrylate, di(n-butyl) itaconate, N-diphenylmethylacrylamide, N-dodecylmethacrylamide, n-dodecyl methacrylate, 2-ethylbutyl methacrylate, 2-ethylhexyl acrylate, N-ethylmethacrylamide, isooctyl acrylate, isotridecylacrylate, and isobornyl acrylate.

Examples of hydrophilic monomers include:
a) negatively charged monomers, such as 2-acrylamido-2-methylpropanesulfonic acid, sodium sulfnonate, vinylsulfonic acid, acrylamidoglycolic acid, methacrylic acid, acrylic acid, itaconic acid, 2-propene-s-sulfonic acid, sodium acrylate, 2-sulfonethyl methacrylate, 3-sulfopropyl acrylate, 3-sulfopropyl methacrylate, vinylbenzoic acid, vinylsulfonic acid, and 2-carboxyethyl acrylate;
b) positively charged monomers such as methacrylamidopropyltrimethylammonium chloride (MAPTAC),acrylamidopropyltrimethylammonium chloride (APTAC), 2-methacryloxyethyltrimethylammonium chloride, methacryloylcholine methyl sulphate, 2-N-morpholinoethyl acrylate, 2-N-morpholinoethyl methacrylate, 1-vinylimidazole, 2, or 4-vinylpyridine, 2-acryloxyethyltrimethylammonium chloride, 2-aminoethyl methacrylate hydrochloride, N-(3-aminopropyl)methacrylamide hydrochloride, 2-(tert-butylamino)ethyl methacrylate, diallyamine, diallyldimethylammonium chloride, 2-(N,N-diethylamino)ethyl methacrylate, 2-(diethylamino) ethylstyrene, 2-(N,N-dimethylamino)ethyl acrylate, N-[2-(N,N-dimethylamino)ethyl]methacrylamide, 2-(N,N-dimethylamino)ethyl methacrylate, and N-[3-(N,N-Dimethylamino)propyl](meth)acrylamide; and c) neutral hydrophilic monomer such as 4-hydroxybutyl methacrylate, 2-hydroxylethyl (meth)acrylate, N-(2-hydroxypropyl)methacrylamide, hydroxypropyl (meth)acrylate, (meth)acrylamide, N-methacryloylmorpholine, N-methylmethacrylamide, N-methlolacrylamide, monoacrykoxyethyl phosphate, 1,1,1-trimethylolpropane diallyl ether, 1,1,1-trimethylolpropane mono allyl ether, poly(ethylene glycol) monomethacrylate, poly(propylene glycol)monomethacrylate, N-isopropylacrylamide, N-vinylcaprolactam, N-vinylformamide, vinyl-4-hydroxybutylether, N-vinyl-N-methacetamide, vinyl methylsulfone, N-vinyl-2-pyrrolidone, N-vinylurea, acrylamide, N-acryloylmorpholine, N-acryloyltri(hydroxymethyl)methylamine, diethylacrylamide, N,N-diethylmethacrylamide, N,N-dimethylacrylamide,N,N-Dimethylmethacrylamide, glycerol monoacrylate, glycerol monomethacrylate, 2-(2-ethoxyethoxy)ethyl acrylate, and tetrahydrofurfuryl acrylate.

The random copolymers of hydrophilic and hydrophobic monomers can also optionally comprise one or more reactive monomers, such as methacrylic anhydride, vinyl azlactone, acrylic anhydride, allyl glycidyl ether, allylsuccinic anhydride, 2-cinnamoyloxyethyl acrylate, cinnamyl methacrylate, citraconic anhydride, and glycidyl acrylate. Presence of a reactive monomer can lead to a chemically active composite material.

Examples of random copolymers of hydrophilic and hydrophobic monomers include poly(2-acrylamido-2-methylpropanesulfonic acid-co-N-t-butylacrylamide), poly(N-vinylformamide-co-N-t-butylacrylamide, poly(2-acrylamidopropane-trimethyl ammonium chloride-co-N-t-butylacrylamide), poly(methacrylamidopropane-trimethylammonium chloride-co-N-t-butylacrylamide), poly (2-acrylamido-2-methylpropanesulfonic acid-co-methylmethacylate) poly(N-vinylformamide-co-co-methylmethacylate), poly(2-acrylamidopropane-trimethyl ammonium chloride-co-methylmethacylate) and poly(methacrylamidopropane-trimethylammonium chloride-co-methylmethacylate).

Composition of the Second Polymer Layer

To achieve a composite material in accordance with the invention, the second polymer layer is more hydrophilic than the first polymer layer and it interacts with the first polymer layer so as to give a durably coated composite material.

Similarly to the polymer that forms the first polymer layer, the polymer comprising the second polymer layer preferably forms a gel. To form the second layer, the gel-forming polymer is preferably crosslinked, to insure that the pores of the support member are durably coated. In some embodiments, the process of crosslinking the second polymer layer will lead to the formation of covalent bonds between the first and second layers, further stabilising the layers within the composite material.

Examples of monomers that can be crosslinked to obtain a suitable second polymer layer include, for example, ethyleneimine, 4-styrenesulfonic acid, vinyl alcohol, acrylic acid, diallyldimethylammonium chloride, acrylamide and vinylpyrrolidone,2-acryloxyethyltrimethylammonium chloride, N-acryloyltris(hydroxymethyl)methylamine, 2-aminoethyl methacrylate hydrochloride, N-(3-aminopropyl)methacrylamide hydrochloride, N,N-diethylacrylamide, N,N-dimethylacrylamide, 2-(N,N-dimethylamino)ethyl acrylate and methacrylate, N-[3-(N,N-dimethylamino)propyl]methacrylamide, N,N-dimethylacrylamide, n-dodecyl acrylate, n-dodecyl methacrylate, 2-(2-ethoxyethoxy)ethyl acrylate and methacrylate, 2,3-dihydroxypropyl acrylate and methacrylate, glycidyl acrylate and methacrylate, n-heptyl acrylate and methacrylate, 1-hexadecyl acrylate and methacrylate, 2-hydroxyethyl acrylate and methacrylate, N-(2-hydroxypropyl)methacrylamide, hydroxypropyl acrylate and methacrylate, methacrylamide, methacrylic anhydride, methacryloxyethyltrimethylammonium chloride, 2-(2-methoxy) ethyl acrylate and methacrylate, N-iso-propylacrylamide, 4-vinylpyridine, vinylsulfonic acid, N-vinyl-2-pyrrodinone. Particularly preferred monomers include dimethyldiallylammonium chloride, acrylamido-2-methyl-1-propanesulfonic acid (AMPS), (3-acrylamidopropyl) trimethylammonium chloride (APTAC), acrylamide, methacrylic acid (MAA), acrylic acid (AA), 4-styrenesulfonic acid and its salts, acrylamide, glycidyl methacrylate, diallylamine, and diallylammonium chloride.

Examples of polymers that can be crosslinked to obtain a suitable second polymer layer include, for example, poly (ethyleneimine) (PEI), poly(4-styrenesulfonic acid), poly(vinyl alcohol) (PVA), poly(acrylic acid) (PAA), poly(diallyldimethylammonium chloride) (PDADMAC), polyacrylamide (PAcAm) and polyvinylpyrrolidone (PVPR).

In order to enhance the degree of crosslinking in the polymer layer, use can be made of a crosslinking agent. Examples of crosslinking agents include compounds containing at least two vinyl or acryl groups, for example bisacrylamidoacetic acid, 2,2-bis[4-(2-acryloxyethoxy)phenyl]propane, 2,2-bis (4-methacryloxyphenyl)propane, butanediol diacrylate and dimethacrylate, 1,4-butanediol divinyl ether, 1,4-cyclohexanediol diacrylate and dimethacrylate, 1,10-dodecanediol diacrylate and dimethacrylate, 1,4-diacryloylpiperazine, diallylphthalate, 2,2-dimethylpropanediol diacrylate and dimethacrylate, dipentaerythritol pentaacrylate, dipropylene glycol diacrylate and dimethacrylate, N,N-dodecamethylenebisacrylamide, glycerol trimethacrylate, glycerol tris (acryloxypropyl) ether, N,N'-hexamethylenebisacrylamide, N,N'-octamethylenebisacrylamide, 1,5-pentanediol diacrylate and dimethacrylate, 1,3-phenylenediacrylate, poly (ethylene glycol) diacrylate and dimethacrylate, poly(propylene) diacrylate and diamethacrylate, triethylene glycol diacrylate and dimethacrylate, triethylene glycol divinyl ether, tripropylene glycol diacrylate and dimethacrylate. Particularly preferred crosslinking agents include N,N',-methylenebisacrylamide, diethylene glycol diacrylate and dimethacrylate, ethylene glycol diacrylate and dimethacrylate, tetra(ethylene glycol) diacrylate, 1,6-hexanediol diacrylate, divinylbenzene, poly(ethylene glycol) diacrylate, trimethylolpropane triacrylate (TRIM), and glutaric dialdehyde.

With the addition of the second polymer layer, it is possible to introduce a permanent charge to the composite material. The charge introduced can be either positive or negative, and the charge density introduced can also be controlled. The charge introduced typically takes the form of functional groups that are weak or strong acids or bases.

While the polymer used to form the second polymer layer can itself bear a charge, additional charge can be added in the form of monomers that are added prior to the crosslinking of the second polymer layer. Examples of suitable charge-bearing monomers include diallyldimethylammonium chloride, [3-(methacryloylamino)propyl]-trimethylammonium chloride, methacryloxyethyltrimethylammonium chloride, 2-acryloxyethyltrimethylammonium chloride, 2-acrylamido-2-methyl-1-propanesulfonicacid, 4-styrene sulfonic acid and sodium salt hydrate, acrylic acid, methacrylic acid, vinylsulfonic acid, diallylamine, diallylammonium chloride. The thickness of the second polymer layer can be regulated by controlling the amount and nature of the incorporated polymer.

The gel polymer forming the second layer preferably has a molecular weight of from 5,000 to 500,000 g/mol, more preferably of from 10,000 to 100,000 g/mol. However, these ranges for molecular weight of the gel polymer are not meant to be limiting, as the molecular weight will be dictated by the nature of the support member, the nature of the gel polymer and the nature of the solvent being passed through the composite material. As long as the gel polymer meets the requirement that it be substantially insoluble but swellable in the solvent being passed through the composite material, it is to be considered part of the present invention. Preferably, the gel polymer is homogeneous or microheterogeneous.

Preferably, the thickness of the second polymer layer is from 0.001 m to 0.1 m. More preferably, the thickness is from 0.005 μm to 0.01 μm.

Further Polymer Layers

While the description herein generally describes composite materials comprising two polymer layers, further polymer layers (e.g. 1, 2, 3, 4, 5, 6, 7, 8, 9 or 10 additional layers) can be introduced provided they have a suitable interaction with the previous polymer layer such that they durably coat the previous polymer. Preferably, each further polymer layer is covalently bonded to the previous polymer coating. It is also preferred that each subsequent polymer layer be more hydrophilic than the previous polymer layer.

Porous Support Member

In some embodiments, the porous support member can have pores having an average diameter between about 0.1 and about 30 μm, and a volume porosity between about 40 and about 90%. In other embodiments, the porous support can have an average diameter between about 0.5 and about 20 μm, and a volume porosity between about 70 and about 90%. Volume porosity, ε, of a support can be calculated from the mass and volume of a geometrically regular sample, e.g., square, rectangular, or disk, provided that the specific density of the support polymer is known. The equation that can be used is:

$$\varepsilon = \left( \frac{V_s - \frac{m_s}{d_{polymer}}}{V_s} \right)$$

where $V_s$ is the volume of a geometrically regular support sample, $m_s$ is the mass of the sample, and $d_{polymer}$ is the density of the support polymer. For example, for polypropylene, $d_{polymer}$=0.91 g/cm$^3$.

Many porous materials can be used as the support member but the support is preferably a polymeric material, and it is more preferably a polyolefin. Examples of polyolefin support members include those made by thermally induced phase separation (TIPS), or non-solvent induced phase separation. Specific examples of suitable polyolefin support materials include SUPOR® polyethersulfone membranes manufactured by Pall Corporation, Cole-Parmer® Teflon® membranes, Cole-Parmer® nylon membranes, cellulose ester membranes manufactured by Gelman Sciences, and Whatman® filter and papers. Non-polymeric support members, such as ceramic-based supports, can also be used.

Additional types of support member materials include fibrous materials, examples of which include fibrous polyolefins such as non-woven fibrous polyesters or non-woven fibrous polypropylenes (available, for example, as TR2611A from Hollingsworth and Vose Company). Other types of fibrous materials include melt blowns or woven materials, which can comprise, for example, polyolefins, polyesters, polyamides or cellulosic materials. For non-woven materials, a preferred range for pore size is from 0.5 to 10 μm and a preferred range for porosity is from 70 to 85%. For woven materials a preferred range for pore size is from 0.1 to 1 μm and a preferred range for porosity is from 70 to 85%.

The porous support member can take various shapes and sizes, such as, for example, flat sheets, hollow fibres, and tubular membranes. In one embodiment, the support member is in the form of a flat sheet that has a thickness of from about 10 to about 1000 μm, in another embodiment from about 10 to about 500, and in yet another embodiment from about 10 to about 300 μm.

Preparation Process

Composite materials of the invention are prepared by applying multiple polymer layers onto a support member. The process used to apply a polymer layer is dictated by whether the polymer layer is to be crosslinked or non-crosslinked, and by whether a first polymer or a subsequent layer is being deposited.

For non-crosslinked polymer layers, a precipitation method or an evaporation method can be used.

The precipitation method comprises the steps of dissolving a polymer in a suitable first solvent, filling the pores of the support member with the solution obtained, and introducing a second solvent to the pores to precipitate out the polymer from the first solvent, the polymer remaining in the pores.

When using a precipitation method to prepare the composite material of the invention, the characteristics of the gel polymer that coats the pores of the support member can be controlled through the selection of the polymer used (nature of the polymer), by the concentration of the polymer in the first solvent, and by the choice of the first solvent used. Preferably, a lower concentration of gel polymer is used (e.g. less than about 20%, more preferably from 0.5% to 5% by weight).

The precipitation step can be carried out, for example, over a period of 10 seconds or greater. In one embodiment, the precipitation step is carried out over a period of about 10 minutes. Following the precipitation step, the formed polymer layer can optionally be washed out with a solvent in which the polymer is non-soluble but swellable to remove any leachables from the composite material.

Generally, a precipitation method has the advantages that:
a) the gel distribution and morphology can be controlled by controlling the penetration of the second solvent. As such, asymmetrically coated or filled composite materials can be prepared;
b) there is no need for low molecular weight organic molecules, such as monomers, initiators, and crosslinking agents, therefore avoiding the need for their subsequent removal;
c) the amount of organic solvent used is less than with traditional methods; and d) the process is simple and rapid, and it can be readily scaled to a continuous production.

The evaporation method comprises the steps of dissolving a polymer in a suitable solvent, filling the pores of the support member with the solution obtained, and evaporating the solvent from the pores, leaving behind the polymer. It is preferred that a polymer being deposited have good film-forming properties for the support.

For crosslinked polymer layers, simple, single step methods can be used. These methods can, in some embodiments, use water or other benign solvents, such as methanol, as the reaction solvent. The methods also have the benefit of using rapid processes that lead to easier and continuous manufacturing possibilities.

The crosslinked polymer layers can be prepared, for example, by mixing one or more monomers, one or more polymers, or mixtures thereof, optionally one or more crosslinking agents, and optionally one or more initiators, in one or more suitable solvents. The solution produced is preferably homogeneous, but a slightly heterogeneous solution can be used. The mixture is then introduced into a suitable porous support member, where a polymer forming reaction takes place. In order to facilitate and enhance the formation of crosslinked polymer layers, crosslinking agents can be added to the reaction mixture prior to initiation. These crosslinking agents can be added, for example, in molar concentrations of from 1 to 50%, more preferably from 5 to 20%. Examples of suitable crosslinking agents are given above.

In some embodiments, where the monomer or polymer has a functional group, the monomers or polymers can be functionalized prior to crosslinking to offer the possibility of carrying out further reactions with other monomers that comprise unsaturated bonds. Such a functionalization can be achieved, for example, by the reacting the monomer or polymer with glycidyl methacrylate.

Suitable solvents for the gel forming reaction include, for example, water, dioxane, dimethylsulfoxide (DMSO), dimethylformamide (DMF), acetone, ethanol, N-methylpyrrolidone (NMP), tetrahydrofuran (THF), ethyl acetate, acetonitrile, toluene, xylenes, hexane, N,N'-dimethylacetamide, propanol, dipropyleneglycol monomethyl ether (DPM) and methanol. It is preferable to use solvents that have a higher boiling point, as these solvents reduce flammability and facilitate manufacture. It is also preferable that the solvents have a low toxicity, and they can be readily disposed of after use. An example of such a solvent is dipropyleneglycol monomethyl ether (DPM).

In some embodiments, it is possible to use dibasic esters (esters of a mixture of dibasic acids) as the solvent. Dibasic esters (DBEs) are especially suitable for preparing gels based on acrylamide monomers. These solvent systems have an unexpected characteristic in that they are poorly soluble in water, which differs from the other solvents used which are essentially completely water miscible. While water miscible solvents offer advantages in terms of solvent removal after fabrication, water immiscible solvents such as DBE's are good replacements, in certain cases, for solvents such as dioxane that are volatile, flammable, and toxic.

In some embodiments, components of the gel forming reaction react spontaneously at room temperature to form the gel. In other embodiments, the gel forming reaction must be initiated. The gel forming reaction can be initiated by any known method, for example through thermal activation or U.V. irradiation. The reaction is preferably initiated by U.V. irradiation in the presence of a photoinitiator, as this method accelerates the gel forming reaction more than the thermal activation method. Many suitable photoinitiators can be used, of which 2-hydroxy-1[4-2(hydroxyethoxy)phenyl]-2-methyl-1-propanone (Irgacure 2959*), and 2,2-dimethoxy-2-phenylacetophenone (DMPA) are preferred. Other suitable photoinitiators include benzophenone, benzoin and benzoin ethers such as benzoin ethyl ether and benzoin methyl ether, dialkoxyacetophenones, hydroxyalkylphenones, and α-hydroxymethyl benzoin sulfonic esters. Thermal activation requires the addition of a thermal initiator. Suitable thermal initiators include e.g. 1,1'-azobis(cyclohexanecarbonitrile) (VAZO® catalyst 88), azobis(isobutyronitrile) (AIBN), potassium persulfate, ammonium persulfate, and benzoyl peroxide.

If the reaction is to be initiated by U.V. irradiation, a photoinititor is added to the reactants of the gel forming reaction, and the support member containing the mixture of monomer, crosslinking agent and photoinitiator is subjected to U.V. irradiation at wavelengths of from about 250 nm to about 400 nm, for a period of a few seconds to a few hours. With certain photoinitiators, visible wavelength light may be used to initiate the polymerization. To permit the initiation, the support material must have a low absorbance at the wavelength used, to permit transmittance of the UV rays through the support. Preferably, the support and gel reagents are irradiated at a wavelength of about 350 nm for a few seconds to up to about 2 hours.

Preferably, thermally initiated polymerization is carried out at about 60-80° C. for a few minutes up to about 16 hours.

Once the composite materials are prepared, they can be washed with various solvents to remove any unreacted components and any polymer or oligomers that are not anchored within the support. Solvents suitable for the washing of the composite material include water, acetone, methanol, ethanol, and DMF.

To obtain a charged composite material or to increase the density of the charge in an already charged polymer, charge-bearing cross-linkable monomers can be added to the layer-forming polymer prior to crosslinking. In one embodiment, the charge-bearing cross-linkable monomers are charged when they are added to the reaction mixture, while in another embodiment, the charge-bearing cross-linkable monomers have groups that can become charged when exposed to a specific environment, such as to a specific pH. Examples of suitable charge-bearing crosslinkable monomers include diallyldimethylammonium chloride, [3-(methacryloylamino)propyl]-trimethylammonium chloride, 2-acrylamido-2-methyl-1-propanesulfonic acid, 4-styrene sulfonic acid and sodium salt hydrate, acrylic acid, methacrylic acid. The charge-bearing cross-linkable monomers can be added, for example, in molar concentrations of from about 10 to about 70%, and preferably from about 20 to about 50%.

In addition to charge-bearing monomers, neutral monomers can also be introduced into the composite material. Examples of such monomers include, for example, 1-vinylpyrrolidinone, acrylamide, hydroxy ethyl methacrylate (HEMA), and glycidyl methacrylate.

Preferably, the first polymer layer in the composite material is non-crosslinked, while the second and any subsequent polymer layers are preferably crosslinked. In one embodiment, the first polymer layer can be deposited as a non-crosslinked polymer layer, which first layer is subsequently crosslinked simultaneously with the second polymer layer. In another embodiment, the first polymer is crosslinked prior to the deposition of the second layer, which second layer is then also crosslinked. In some embodiments, a covalent bond between the first and second polymer layers is formed.

Once the composite material has been prepared, it is possible to alter its properties through post-process means. For example, air drying of the composite material sample, followed by a rewetting of the sample, leads to a composite material that displays increased flux values. A slight increased in flux can also be achieved by thermally treating the samples.

Use of the Composite Material

Anaerobic biological treatment of municipal and industrial wastewaters has several potential operational and economic advantages over conventional aerobic treatment methods. However, the high solids retention times required for anaerobic treatment of low strength wastewaters such as municipal wastewater require solids recycling, for example by membranes in an anaerobic membrane bioreactors (AMBR). The anaerobic environment of AMBRs is more problematic with respect to membrane fouling than the conventional aerobic environment in which bioreactors are used. Membrane fouling is a problem as it leads to a decline in flux, which is related to a drop in operational efficiency, and furthermore, the eventual need to clean or replace the membranes. The composite materials of the invention are especially well suited for use in AMBRs.

Composite materials bearing a charged surface are also important in reducing fouling since surface colonization of the membrane by bacterial cells in an membrane bioreactor (MBR) can occur. It is believed that negative membrane surface charges may further enhance resistance to bacterial colonization of the membrane due to charge-charge repulsion between the membrane surface and bacterial cells, which generally possess a net negative surface charge. Alternatively, it has been hypothesised that the antimicrobial properties of a strongly positively charged surface might prevent bacterial colonisation. In addition, surface charge can affect fouling by colloidal particles and struvite, both of which are important foulants of wastewater treatment membranes used in MBRs. In the case of struvite fouling, it has been shown that an acidic environment in the membrane pores reduces fouling.

As the layers in the composite materials of the invention are uniformly distributed over the surfaces of the support members, including the surface of pores therein, fouling in MBR is reduced as it has been observed that fouling often occurs within the interior pore channels.

The wide interest in effective coating methods for hydrophobic UF membranes means that this technology has much wider application than just MBRs.

The composite material of the invention benefits from many advantages over previously known composite materials. As a broad range of polymers can be used to coat or fill the pores of the support member, the composite material can be tailored to have superior separation properties, to bear a controlled number of charged groups and/or to display good chemical resistance.

One of the surprising and unexpected features of the composite materials of the invention is that they are very stable over long periods of time and use. In the case of composite materials comprising water insoluble but swellable gel polymers subjected to water-based feeds, this stability holds true even when the contacting solutions are either strongly acidic or strongly basic.

The composite materials can also act as ultrafiltration composite materials. In the case of ultrafiltration composite materials the precipitated polymer can be either charged or neutral. Ultrafiltration applications are especially of interest in the biopharmaceutical and food/beverage industries.

While the composite materials of the invention are preferably used to carry out separation processes in aqueous media, they can also be used with non-aqueous fluids in which the composite material remains stable.

The invention is further illustrated by the following non-limiting examples.

EXPERIMENTAL

Materials Used

The monomers used were glycidyl methacrylate (Polysciences Inc.), 1-vinyl-2-pyrrolidinone (Aldrich), (3-acrylamidopropane)trimethylammonium chloride (APTAC) (Aldrich), diallyldimethylammonium chloride (DADMAC) (Aldrich), 3(methacryloylamino)propyl-trimethyl ammonium chloride (MAPTAC) (Aldrich) and N,N-methylenebisacrylamide (Aldrich). The polymers used were poly(ethyleneimine) (PEI) (MW:~25 000), poly(vinyl alcohol-co-ethylene) (EVAL) (ethylene content 27, 32, 38 and 44 mole %) (Aldrich), poly(4-styrenesulfonic acid) (18 wt. % solution in water) (Aldrich), poly(acrylic acid) (MW:~50 000) (Polysciences, Inc.), poly(vinyl alcohol) (PVA) (88 mole % hydrolyzed, MW:~78,000) (Polysciences, Inc.), and poly(ether-ether-ketone)(PEEK)(VICTREX PEEK 450 PF, VICTREX USA, Inc.). Glutaric dialdehyde (GAL), 50 wt. % solution in water (Aldrich) was used as a cross-linker. The solvents used were N,N-dimethylacetamide (DMAc) (Fisher Chemical), N,N'-dimethylformamide (Calcdon), dimethyl sulphoxide (Calcdon), methyl alcohol (Calcdon), ethyl alcohol (Calcdon), acetone (Calcdon) and deionized water. Other chemicals used were concentrated sulphuric acid (Aldrich), 1N hydrochloric acid, 1N sodium hydroxide, sodium chloride, sodium azide, tris(hydroxymethyl)aminomethane (TRIS), and 4-morpholineethanesulfonic acid (MES) (Sigma).

Proteins used were bovine serum albumin (BSA) and lysozyme (Sigma).

The porous support used was poly(propylene) thermally induced phase separation (TIPS) membranes PP5 with an average pore diameter of 0.45 µm and porosity of 85 vol-% produced by 3M Company.

Preparation of Materials

Sulfonation of Poly(ether-ether-ketone)

Poly(ether-ether-ketone) (PEEK) powder was dried at 120° C. for 2 hrs and then cooled to room temperature prior to use. 20 g of PEEK were dissolved in 300 ml of concentrated sulphuric acid (95-97%) under vigorous stirring. The reaction was allowed to continue for 150 (for a medium degree of sulfonation) and 200 hrs (for a high degree of sulfonation) at room temperature. Thereafter, the homogeneous polymer solution was precipitated in water and washed with water until neutral. The solid sulfonated polymer thus obtained was dried at room temperature for 48 hrs and additionally for 8 hrs at 60° C. in an oven.

Preparation of Pore-coated Composite Material

The pore-coated composite material of the invention containing at least one layer of coating can be prepared according to the following general procedure.

First Layer of Coating

A weighed flat support member was placed on a poly(ethylene)(PE) sheet and a polymer solution was applied to the sample. The sample was subsequently covered with another PE sheet and a rubber roller was run over the sandwich to remove excess solution. The resulting filled material was immersed in water to exchange the solvent and precipitate the polymer inside the pores. The composite material was then thoroughly washed with water and stored in distilled water or a salt solution.

In some embodiments the resulting filled material was framed and air-dried.

Second Layer of Coating

After washing the sample with water, the surface water was removed with a tissue and the sample was placed in a bath containing polymer solution for 10 min to replace water by the polymer solution. Thereafter, the sample surface was slightly dried with tissue and it was framed and placed in an oven at 60° C. for 20 min for the crosslinking process to occur. The sample was then washed with water for 30 min, again dried in an oven, weighed to estimate the mass gain and re-wetted for the water flux measurements.

In other embodiments the dry sample coated with the first layer was kept between two polyethylene sheets, and a functionalized polymer solution, containing monomers, crosslinker and initiator was applied. The sample was then run between two rubber rollers to press the solution into the pores of the sample and to remove the excess solution. The sample was sealed, without allowing any solvent evaporation, and then irradiated under a UV lamp at 365 nm. After 15 min of irradiation (uniformly on each side) the sample was removed and immersed in deionised water for 2 hrs to allow the unreacted chemicals to diffuse out of the composite material.

Characterisation of Coated Composite Materials

The pore-coated composite materials were characterised by mass gain, ion-exchange capacity (charge density), water flux, wettability and extractables. Additionally, an environmental scanning electron microscopy (ESEM) study was carried out.

Environmental Scanning Electron Microscopy (ESEM) Study

For environmental scanning electron microscopy (ESEM) study, the composite material sample was glued to aluminium stubs. The sample on the stubs was viewed using an environmental scanning electron microscope (ESEM) (ElectroScan model 2020 ESEM, Electro Scan Corp., Wilmington, Mass.) with water vapour present in the sample chamber to prevent drying of the sample.

Ion-exchange Capacity

Ion-exchange capacity (IEC) was estimated by salt exchange with following testing by ion-chromatography.

For negatively charged composite materials (containing —$SO_3^-$ groups):

A composite material sample was placed in 1N NaCl for 24 hrs to convert negatively charged sites in $Na^+$—form. Then, the sample was washed with water to remove excess of salt solution. Thereafter, the sample was cut in small pieces, placed in a 500 ml flask and 100 ml 0.05M $Ca(Cl)_2$ was added. The sample was left in this solution for 24 hrs. Then, the solution was diluted with water to 500 ml and tested with an ion-chromatograph on sodium content at least 3 times. IEC was estimated according to the formula:

$$IEC = \frac{C_{Na} \cdot V}{M_{Na} \cdot m_{dry}}$$

where $C_{Na}$ is a sodium content (ppm); V is a total volume; $M_{Na}$ is a molecular weight of sodium; and $m_{dry}$ is a mass of dry sample For positively charged composite materials (containing quaternary ammonium groups):

A composite material sample was placed in 1N NaCl for 24 hrs to convert positively charged sites into $Cl^-$ form. Then, the sample was washed with water to remove excess salt solution. Thereafter, the sample was cut in small pieces, placed in a 500 ml flask and 100 ml 0.05M $Na_2SO_4$ was added. The sample was left in this solution for 24 hrs. Then, the solution was diluted with water to 500 ml and tested with ion-chromatograph on chloride content at least 3 times. IEC was estimated as follows:

$$IEC = \frac{C_{Cl} \cdot V}{M_{Cl} \cdot m_{dry}}$$

where $C_{Cl}$ is the chloride content (ppm); V is the total volume; $M_{Cl}$ is the molecular weight of chloride; and $m_{dry}$ is the mass of the dry sample.

Determination of Extractables

The extractables test was carried out using the procedure described by John Charkoudian, of the Millipore Corporation as described in International Publication Number: WO 03/008011 A1.

A 25 $cm^2$ piece of each sample was then cut and put, one each, in closed containers containing a measured volume of DI water for 16 hrs. The water samples were then tested to determine the total organic carbon (TOC) in it. A TOC analyzer (IO Corporation, Model 1010 Wet Oxidation TOC Analyzer) was used for this experiment. A TOC content of water was subtracted as background from the measured values obtained in the test.

Water Flux Measurements

Water flux measurements through the composite material were carried out after the samples had been washed with water, dried for at least 30 min and re-wetted. As a standard procedure, a sample in the form of a disk of diameter 7.8 cm was mounted on a sintered grid of 3-5 mm thickness and assembled into a cell supplied with compressed nitrogen at a controlled pressure. The cell was filled with deionized water and a desired pressure was applied. The water that passed through the composite material in a specified time was collected in a pre-weighed container and weighed. All experiments were carried out at room temperature and at atmospheric pressure at the permeate outlet. Each measurement was repeated three or more times to achieve a reproducibility of ±1.5%. The water flux, $Q_{H2O}$ (kg/$m^2$h), was calculated from the following relationship:

$$Q_{H2O} = \frac{(m_1 - m_2)}{A \cdot t}$$

where $m_1$ is the mass of container with the water sample, $m_2$ is the mass of container, A is the active sample surface area (38.5 $cm^2$) and t is the time.

Chemical Stability Experiment

Coated composite materials were placed into 1N HCl, 1N NaOH for 7, 14, 28 and 40 days and into 225 ppm NaOCl for 20 hrs at room temperature. Thereafter, samples were washed with water until neutral, dried in an oven at 60° C. for 30 min and weighed, then re-wetted and water flux through the samples was measured. Additionally, positively charged composite material were tested with boiling water. Thus, samples were put in boiling water for 2 hrs and flux values were measured and compared with the original flux and the weight change was recorded.

Mass Gain

In order to determine the amount of gel formed in the support member, the sample was dried in vacuum at room temperature to a constant mass. The mass gain due to gel incorporation was calculated as a ratio of an add-on mass of the dry gel to the initial mass of the porous support member.

Protein Adsorption/Desorption Experiment

Protein adsorption studies were carried out with BSA and lysozyme in static conditions.

In the case of experiments with a positively charged composite material in the form of a membrane, the membrane sample was first washed with distilled water and subsequently with a TRIS-buffer solution (pH=7.8). In an adsorption step, a composite material sample with surface area of 25 cm$^2$ was placed in 50 ml of 1 g/L BSA solution in 25 mM TRIS buffer for 24 hrs. Thereafter, the solution was UV analyzed at 280 nm. The amount of BSA adsorbed was calculated taking into account BSA content in stock and treatment solutions. Following the adsorption step, the composite material was washed with about 200 ml of the TRIS-buffer solution, and desorption was carried out with a TRIS-buffer solution containing 1M NaCl. The solution was tested by UV analysis at 280 nm for BSA content.

In the case of experiments with a negatively charged composite material, the membrane sample was first washed with distilled water and subsequently with a 10 mM MES-buffer solution (pH=5.5). In the adsorption step, a composite material sample with surface area of 25 cm$^2$ was placed in 50 ml of 1 g/L Lysozyme solution in 10 mM MES buffer for 24 hrs. Thereafter, the solution was UV analyzed at 280 nm. The amount of Lysozyme adsorbed was calculated taking into account BSA content in stock and treatment solutions. Following the adsorption step, the composite material was washed with about 200 ml of the 10 mM MES-buffer solution, and desorption was carried out with a 10 mM MES-buffer solution containing 1M NaCl. The solution was tested by UV analysis at 280 nm for BSA content.

Comparative Example A

This comparative example illustrates the formation of an unsupported gel, which can be used as the gel to prepare a composite material of the invention.

A solution containing 2.5 w-% poly(ethylene-co-vinyl alcohol) (EVAL) (27 mole % ethylene content) in N,N'-dimethylacetamide was added to water. Immediately a soft white gel was formed, water being a poor solvent for EVAL. A formed gel was washed thoroughly with de-ionized water to exchange the solvent.

Figure 1B:
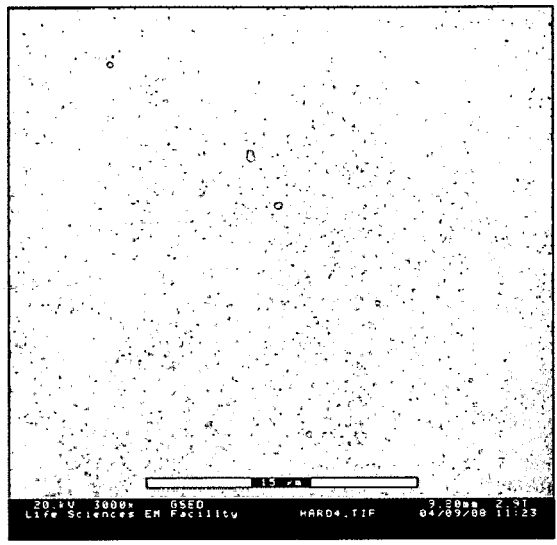

The gel formed was mechanically very weak. A sample of the gel was examined using an environmental scanning electron microscope (ESEM) with water vapour present in the sample chamber to prevent drying of the gel. The micrograph is shown in FIG. 1 (a). To demonstrate a significant difference in EVAL-gel structure formed by precipitation and evaporation routes, an ESEM image of an EVAL dense film was also viewed. For that, 2.5w-% EVAL (27 mole % ethylene content) in N,N'-dimethylacetamide was poured in a Petri dish and placed in an oven at 60° C. for 24 hrs (FIG. 1 (b)).

Comparative Example B

This comparative example describes the preparation of a neutral composite material with a single coating.

A 2.5 wt-% solution was prepared by dissolving poly(vinyl alcohol-co-ethylene) (EVAL) (27 mole % ethylene content) in N,N-dimethylacetamide at 70° C. overnight. The microporous poly(propylene) support member was placed on a polyethylene sheet. Thereafter the EVAL solution was spread evenly over it. The substrate was subsequently covered with another polyethylene sheet and the sandwich was run between two rubber rollers to press the polymer solution into the pores and remove excess of solution. The filled substrate was immersed to the water bath for 10 min to precipitate the polymer. Thereafter the composite material was framed and dried at room temperature and then in an oven at 50° C. for 30 min.

Figure 2A:
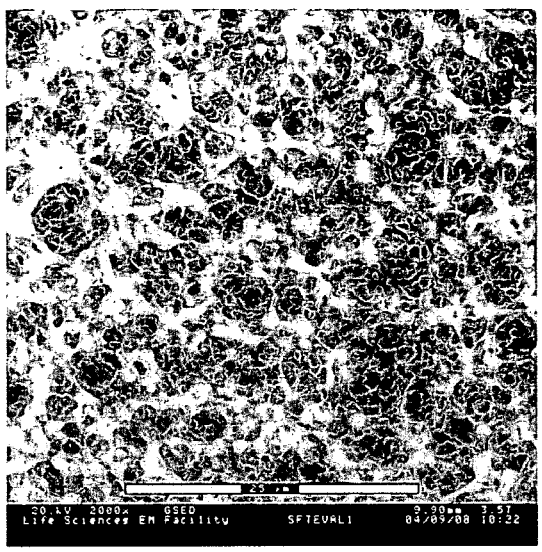
FIG. 2 shows an ESEM image of an EVAL composite material formed by precipitation (FIG. 2a) and evaporation (FIG. 2b).
Figure 2B:
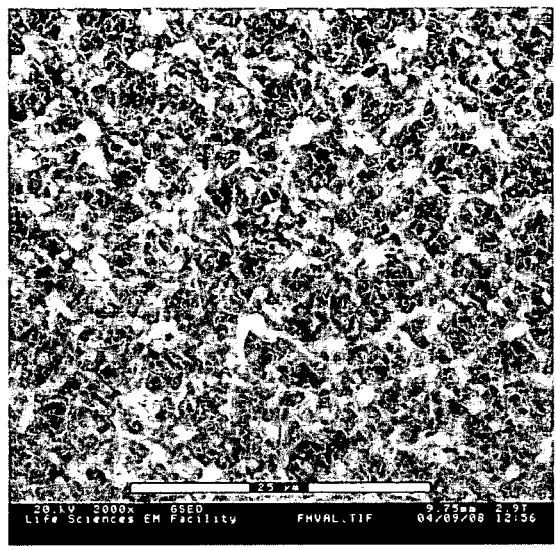

The composite material thus obtained was wettable at room temperature in 5 min and showed mass gain of 15.5±0.1% and water flux of 16,500±100 kg/m$^2$ hr at 100 kPa. An ESEM image of the composite material is presented in FIG. 2 (a). Additionally, the composite material with single coating was prepared by evaporation route. Thus, a 2.5 wt-% solution was prepared by dissolving poly(vinylalcohol-co-ethylene) (EVAL) (27 mole % ethylene content) in N,N-dimethylacetamide at 70° C. overnight. The microporous poly(propylene) support member was placed on a polyethylene sheet. Thereafter the EVAL solution was spread evenly over it. The substrate was subsequently covered with another polyethylene sheet and the sandwich was run between two rubber rollers to press the polymer solution into the pores and remove excess of solution. The filled substrate was framed and dried in an oven at 60° C. for 2 hrs.

The composite material thus obtained was not wettable in water at room temperature and showed mass gain of 16.5±0.1% and water flux of 16,700±100 kg/m$^2$ hr at 100 kPa after sample was pre-wetted with acetone. An ESEM image of the composite material is presented in FIG. 2 (b).

Comparative Example C

Water flux was also measured for untreated substrate used in all the comparative examples above. The substrate was wetted with acetone, washed with water and water flux was tested as described in the Experimental section. Substrate showed water flux of 26,000 kg/m$^2$ hr at 100 kPa applied pressure.

Due to some limitation in resolution no significant differences could be indicated in images of samples formed by precipitation and evaporation routes.

Comparative Example D

This comparative example describes effect of ethylene content of EVAL on composite material performance formed by a precipitation route.

The composite material was prepared as described in comparative Example B. Samples of EVAL with ethylene content of 27 mole %, 32 mole %, 38 mole % and 44 mole % were used.

A 2.5 wt-% solution was prepared by dissolving EVAL in N,N-dimethylacetamide at 70° C. overnight.

Composite materials obtained were tested for wettability, mass gain and water flux at 100 kPa. Experimental data are presented in Table 1.

TABLE 1

Effect of ethylene content of EVAL on composite material properties

| Ethylene content of EVAL (%) | Mass gain (%) | Water Flux (kg/m² hr) | Wettability at room temperature (min) |
|---|---|---|---|
| 27 | 15.5 ± 0.1 | 16,500 ± 100 | 5 |
| 32 | 15.5 ± 0.1 | 16,800 ± 100 | 7 |
| 38 | 16.3 ± 0.1 | 18,300 ± 110 | 10 |
| 44 | 15.0 ± 0.1 | 20,700 ± 130 | 20 |

Comparative Example E

This example describes effect of EVAL solution concentration on composite material properties.

The composite material was prepared by a precipitation route as described in Comparative Example B. EVAL with ethylene content 27 mole % was used. EVAL solutions with variable concentration from 1.5 wt-% to 5.0 wt-% were prepared by dissolving EVAL in N,N-dimethylacetamide at 70° C. overnight.

Composite materials obtained were tested for wettability, mass gain and water flux at 100 kPa. Experimental data are presented in Table 2.

TABLE 2

Effect of concentration of EVAL solution on composite material properties

| EVAL concentration(%) | Mass gain (%) | Water Flux (kg/m² hr) | Wettability at room temperature (min) |
|---|---|---|---|
| 1.5 | 8.5 ± 0.1 | 19 000 ± 150 | >30 (poor) |
| 2.0 | 11.1 ± 0.1 | 18 700 ± 130 | >20 (patchy) |
| 2.5 | 15.5 ± 0.1 | 16 500 ± 100 | 5 |
| 5.0 | 28.8 ± 0.1 | 13 300 ± 100 | 1 |

Comparative Example F

This example illustrates the performance of EVAL composite materials made using different solvents.

The composite material was prepared by a precipitation route as described in Comparative Example B. A 2.5% solution of EVAL (27 mole % ethylene content) was prepared using different solvents. N,N' dimethylformamide (DMF), N,N' dimethylacetamide (DMAc), dimethylsulfoxide (DMSO), acetone, ethyl alcohol and methyl alcohol were used as solvents singularly or as various mixtures. The samples were tested for flux and mass gain as described in Experimental part. The wettability was also checked by floating on a water surface (Table 3).

TABLE 3

Effect of solvent for EVAL solution on composite material properties

| No | Solvent used | Mass gain (%) | Water flux (kg/m²/hr) | Wetting time |
|---|---|---|---|---|
| 1 | DMAc | 15.3 ± 0.1 | 16,500 ± 100 | 5.0 min |
| 2 | DMF | 14.9 ± 0.1 | 15,500 ± 100 | 7.5 min |
| 3 | DMSO:Ethanol::70:30 | 14.8 ± 0.1 | 15,500 ± 100 | Immediate |
| 4 | DMSO:Methanol::60:40 | 14.7 ± 0.1 | 15,000 ± 100 | Immediate |
| 5 | DMSO:Acetone::60:40 | 15.4 ± 0.1 | 15,500 ± 100 | Immediate |

Comparative Example G

This example describes determination of extractables for a neutral composite material with a single coating.

Composite materials were produced as described in Comparative Example B. A number of different solvents and solvent mixtures such as N,N'-dimethylacetamide (DMAc), dimethylsulfoxide-ethanol (70:30 v/v), dimethylsulfoxide-acetone (60:40 v/v) were used for preparation of EVAL solution. Variable conditions were used during precipitation step. The water of the bath was changed frequently to ensure adequate leaching of excess chemicals from the samples. The samples were then dried in an oven at 75° C. for 30 minutes.

The leachables test was carried out using the procedure described by John Charkoudian, of the Millipore Corporation as described in International Publication Number: WO 03/008011 A1.

A 25 cm² piece of each samples was then cut and put, one each, in closed containers containing a measured volume of DI water for 16 hrs. The water samples were then tested to determine the total organic carbon (TOC) in it. A TOC analyzer was used for this experiment. (The DI water had a TOC content of 0.67 ppm. This value was subtracted as background from the measured values obtained in the test).

TABLE 4

Extractable from EVAL coated composite materials at different conditions

| No. | Solvent used | Conditions of precipitation step | TOC (μg/cm²) |
|---|---|---|---|
| 1 | DMAc | 10 minutes in cold water | 6.93 |
| 2 | | 30 minutes in cold water; water changed twice | 1.89 |
| 3 | | 10 minutes in hot water, 60° C. | 2.37 |
| 4 | | 30 minutes in hot water, 60° C.; water changed twice[#] | 0.38 |
| 5 | DMSO:Ethanol 70:30 v/v | 30 minutes in cold water, changed twice | 3.21 |
| 6 | | 10 minutes in cold, 20 min. in 60° C. water, (hot water changed once in the middle) | 2.9 |
| 7 | DMSO:Acetone 60:40 v/v | 30 minutes in cold water; water changed twice | 5.9 |
| 8 | | 10 minutes in cold, 20 min. in 60° C. water, (hot water changed once in the middle) | 3.87 |

[#]Precipitation was done in hot (60° C.) water. In all other cases precipitation was done in cold water.

Comparative Example H

This example describes chemical stability of a neutral composite material.

The composite materials were prepared as described in Comparative Example B. Thereafter, their water flux was tested. Then samples were dried an oven at 70° C. and dry weights were recorded. The samples were then immersed in deionised water, 1N HCl and 1N NaOH for 7, 14 and 28 days at room temperature. The samples were removed form the treatment solutions, washed with water until neutral and their water flux and mass gain were recorded as described in Experimental part.

TABLE 5

Effect of chemical treatment on stability of EVAL-coated composite materials.

| # of days | Water flux after treatment (kg/m² hr) | | |
|---|---|---|---|
| | water | 1N HCl | 1N NaOH |
| 0 | 16,300 ± 200 | 16,300 ± 200 | 16,300 ± 200 |
| 7 | 16,300 ± 200 | 16,200 ± 200 | 16,300 ± 200 |
| 14 | 16,300 ± 200 | 16,200 ± 200 | 16 300 ± 200 |
| 28 | 16,300 ± 200 | 16,300 ± 200 | 16,200 ± 200 |

There was no mass loss in the samples in any of the above treatments. All the samples were wettable after the treatments.

Comparative Example I

This example describes effect of autoclaving on EVAL-coated composite material properties.

The composite materials were prepared by precipitation route as described in comparative Example B. N,N'-dimethylacetamide and iso-propanol-water mixture in 60:40 (v/v) ratio were used as a solvents for EVAL.

For wet autoclaving the samples were wetted with water and kept suspended in a pool of water in a beaker. The beaker was loosely capped with an aluminium foil. Autoclaving was done at 120° C. for 20 minutes. The samples were then dried in an oven for 30 min at 65° C. then their wettability was checked by floating on a surface of water For dry autoclaving, the oven-dried samples were kept in a beaker and it was loosely capped with an aluminium foil. Autoclaving was done at 120° C. for 20 minutes. Dry autoclaving yielded unwettable composite materials.

TABLE 6

Effect of wet autoclaving on composite material wettability

| Coating type | Wetting time (min) | |
|---|---|---|
| | Original sample | Wet autoclaved sample |
| 2.5% EVAL in DMAc | 5 | 1 |
| 2.5% EVAL in Isopropanol:water (60:40) (v/v) | 3 | immediate |

INVENTIVE EXAMPLES

Example 1

This example describes the preparation of a negatively charged composite material according to the invention.

First Layer of Coating

A 2.5 wt-% solution was prepared by dissolving EVAL (32 mole % ethylene content) in N,N-dimethylacetamide at 70° C. overnight. The microporous poly(propylene) support member was placed on a polyethylene sheet. Thereafter the EVAL solution was spread evenly over it. The substrate was subsequently covered with another polyethylene sheet and the sandwich was run between two rubber rollers to press the polymer solution into the pores and remove excess of solution. The filled substrate was immersed to the water bath for 10 min to precipitate the polymer.

Second Layer of Coating

After washing with water, the surface water was removed with a tissue and the sample was placed in a bath containing 2.2 wt. % poly(4-styrenesulfonic acid) for 10 min to replace water by the polymer solution. Thereafter, the sample surface was slightly dried with tissue, framed and placed in an oven at 60° C. for 20 min for the crosslinking process to occur. The sample was then washed with water for 30 min, again dried in an oven, weighed to estimate the mass gain and re-wetted for the water flux measurements.

The support member gained 19.5±0.2% of its original weight in this treatment. The composite material was instantly wettable (less than 30 sec) and showed water flux of 12,500±100 kg/m² hr at 100 kPa.

To quantitatively estimate—$SO_3H$ coating, the procedure for measuring the ion-exchange capacity of a sample described above was used. Ion chromatography was applied as an analytical method. Experimental results showed ion-exchange capacity of 0.13 mmol/$g_{dry\ sample}$.

Example 2

This example describes the preparation of a negatively charged composite material according to the invention.

First Layer of Coating

First layer of coating was introduced into the support member as described in Example 1.

Second Layer of Coating

After washing with water, the surface water was removed with a tissue and the sample was placed in a bath containing 1.5 wt. % poly(acrylic acid) for 10 min to replace water by the polymer solution. Thereafter, the sample surface was slightly dried with tissue, framed and placed in an oven at 60° C. for 20 min for the crosslinking process to occur. The sample was then washed with water for 30 min, again dried in an oven, weighed to estimate the mass gain and re-wetted for the water flux measurements.

The support member gained 19.3±0.1% of its original weight in this treatment. The composite material was instantly wettable (less than 30 sec) and showed water flux of 11,500 kg/m² hr±100 at 100 kPa.

To quantitatively estimate—COOH coating, the procedure for measuring the ion-exchange capacity of a sample described above was used. Ion chromatography was applied as an analytical method. Experimental results showed ion-exchange capacity of 0.14 mmol/$g_{dry\ sample}$.

Example 3

This example describes the preparation of a neutral composite material according to the invention.

First Layer of Coating

First layer of coating was introduced into the support member as described in Example 1.

Second Layer of Coating

After washing with water, the surface water was removed with a tissue and the sample was placed in a bath containing 2.5 wt.-% poly(vinyl alcohol) for 10 min to replace water by the polymer solution. Thereafter, the sample surface was slightly dried with a tissue, framed and placed in an oven at 60° C. for 20 min. Then, the sample was washed with water for 20 min, slightly dried with a tissue and placed in an oven at 60° C. The sample was then weighed to estimate the mass gain and re-wetted for the water flux measurements.

The support member gained 20.1±0.2% of its original weight in this treatment. The composite material was instantly wettable (less than 30 sec) and showed water flux of 12,100±100 kg/m$^2$ hr at 100 kPa.

Example 4

This example describes the preparation of a neutral composite material according to the invention.

First Layer of Coating

First layer of coating was introduced into the support member as described in Example 1.

Second Layer of Coating

After washing with water, the surface water was removed with a tissue and the sample was placed in a bath containing 2.5 wt. % poly(vinyl alcohol) for 10 min to replace water by the polymer solution. Thereafter, the sample surface was slightly dried with a tissue, framed and placed in an oven at 60° C. for 10 min and then in 0.1M aqueous glutaraldehyde solution for 20 min. The sample was then washed with water for 20 min, slightly dried with a tissue and placed in an oven at 60° C. for 20 min. The sample was then weighed to estimate the mass gain and re-wetted for the water flux measurements.

The support member gained 20.5±0.2% of its original weight in this treatment. The composite material was instantly wettable (less than 30 sec) and showed water flux of 10,700±150 kg/m$^2$ hr at 10 kPa.

Example 5

This example describes chemical stability of a neutral composite material according to the invention.

The composite materials were prepared as described in Example 3. Thereafter, their water flux was tested, dried an oven at 60° C. and dry weights were recorded. The samples were then immersed in deionised water, 1N HCl and 1N NaOH for 7, 14 and 28 days at room temperature. The samples were removed form the treatment solution, washed with water until neutral and their water flux and mass gain were recorded as described in Experimental part.

TABLE 7

Effect of chemical treatment on stability of EVAL-PVA- coated composite materials

| # of days | Water flux after treatment (kg/m$^2$ hr at 100 kPa) | | |
|---|---|---|---|
| | water | 1N HCl | 1N NaOH |
| 0 | 12,000 ± 100 | 12,000 ± 100 | 12,000 ± 100 |
| 7 | 11,900 ± 100 | 12,200 ± 100 | 12,300 ± 100 |
| 14 | 12,000 ± 100 | 12,100 ± 100 | 13,000 ± 100 |
| 28 | 12,000 ± 100 | 11,500 ± 100 | 13,500 ± 100 |

There was no sample mass loss in any of the above treatments. All the membranes were instantly wettable after the treatments.

Example 6

This example describes a two layer coated composite material based on S-PEEK as a first coat.

First Layer of Coating

Sulfonated poly(ether-ether-ketone) (SPEEK) with a medium degree of sulfonation prepared as described above was characterised in terms of water content and ion-exchange capacity (Exp. part), the latter value being correlated to the sulfonation degree of gel polymer. Thus, 2 g SPEEK was dissolved in 8 g N,N'-dimethylformamide. A solution was cast via a 0.47 mm knife onto a glass plate. The polymer film was dried in an oven for 4 hrs at 60° C. The dense composite material thus obtained had a water content of 25±0.2% and an ion-exchange capacity of 1.5±0.05 mmol/$g_{dry}$ that corresponds to degree of sulfonation of 0.8. Thereafter, SPEEK was used to prepare the pore-coated composite material. Thus, SPEEK was dissolved in N,N-dimethylacetamide to give 5% wt.-% solution. The microporous substrate was placed on a polyethylene sheet. Thereafter, SPEEK solution was spread evenly over it. The substrate was subsequently covered with another polyethylene sheet and the sandwich was run between two rubber rollers to press the polymer solution into the pores and remove excess of solution. The filled substrate was air-dried, keeping it fixed on a frame so that there was no shrinkage of the sample due to drying, to form the first coating.

Second Layer of Coating

A 10 wt-% solution of poly(ethyleneimine) (PEI) was prepared using methanol-water (70:30 vol/vol) as a solvent. A 10% (mol/mol) glycidyl methacrylate (GMA) was added and the reaction was allowed to take place at room temperature for 1 hr. To 14 g functionalized poly(ethyleneimine) solution, monomers containing vinyl groups were added. In Example 1A, 4 g of 1-vinyl-2-pyrrolidinone (VP) was added along with 0.4 g of N,N'-methylenebisacrylamide, in Example 1B 1.8 g of N,N'-methylenebisacrylamide was added, and in Example 1C both 0.5 g of 3(methacryloylamino)propyl-trimethyl ammonium chloride (MAPTAC) and 0.8 g of N,N'-methylenebisacrylamide (MBAA) were added. The dry sample coated with the first layer (SPEEK) was kept between two polyethylene sheets, and the poly(ethyleneimine) solution described above was applied.

The sample was then run between two rubber rollers to press the solution into the pores of the sample and to remove the excess solution. The sample was sealed properly, without allowing any solvent evaporation, and then irradiated under a UV lamp at 365 nm. After 15 min of irradiation (uniformly on each side) the sample was removed and immersed in deionised water for 2 hrs to allow the unreacted chemicals to diffuse out of the composite material. After irradiation, the composite material becomes yellow in colour. The water fluxes of as formed composite materials were measured at 100 kPa. Then the samples were dried, and their weights recorded. The dry samples were again rewetted in water and their fluxes were again measured at 100 kPa applied pressure, as described in the Experimental section.

The mass gain and flux for positive composite materials prepared for each of examples 1A, 1B and 1C are shown in Table 8. The fluxes of composite materials increased significantly upon air drying

TABLE 8

Performance of positively charged coated composite materials

| Composition number of $2^{nd}$ layer | Mass gain of the $1^{st}$ layer (%) | Mass gain of the $2^{nd}$ layer (%) | Initial flux (as formed) (kg/m$^2$/hr) | Flux after drying and rewetting (kg/m$^2$/hr) |
|---|---|---|---|---|
| 1A | 31.5 ± 0.2 | 7.1 ± 0.1 | 16,000 ± 150 | 24,500 ± 200 |
| 1B |  | 13.4 ± 0.1 | 17,000 ± 150 | 24,000 ± 220 |
| 1C |  | 18.3 ± 0.1 | 12,000 ± 120 | 23,000 ± 210 |

The weight gain in the second layer given in the table is the % gain in the $2^{nd}$ layer as a function of total weight up to the $1^{st}$ layer.

The fluxes of all the composite materials increased significantly on air drying the doubly coated final composite materials. This second air drying step was done without using frames for both types of composite materials. The increase in flux after air drying of the double coated composite material is possibly due to the collapse of the gelatinous coating formed during the UV polymerization to the pore and the surface walls of the composite materials.

Example 7

This example illustrates the effect of hot water treatment on composite materials.

Pore-coated composite materials were prepared following the procedure described in Example 6. The composite materials were treated in water at 70° C. for 24 hrs. The composite materials were tested for their flux and after drying, their weight change.

TABLE 9

Effect of treatment of composite materials in hot water

| Composition number of $2^{nd}$ layer | Flux before treatment* kg/m$^2$/hr | Flux after treatment kg/m$^2$/hr | % weight change on treatment |
|---|---|---|---|
| 1A | 24,500 ± 210 | 25,500 ± 240 | 1.6 |
| 1B | 24,000 ± 220 | 25,000 ± 250 | 1.6 |
| 1C | 23,000 ± 200 | 24,000 ± 220 | 1.7 |

*These values are fluxes measured after drying and rewetting the original samples There was a minor increase in the water fluxes of the samples when measured immediately after the completion of the hot water treatment. The mass changes of the composite materials were within experimental errors. There was no observable change in the dimensions of the wet samples after the treatment.

Example 8

This example describes the stability of composite materials in aqueous acid and alkali.

Pore coated composite materials were prepared following the procedure described in Example 6. The samples were dried and their weights recorded. They were kept immersed in water, 1N HCl and 1N NaOH at room temperature for 40 days. After treatment the samples were washed with deionised water and their fluxes measured. The reproducibility of the measurements was ±1.5%. They were then dried to measure their weights.

TABLE 10

Stability of composite materials on treatment with aqueous acid and alkali

| Composition number of $2^{nd}$ layer | Treatment with DI water | | | Treatment with 1N HCl | | | Treatment with 1N NaOH | | |
|---|---|---|---|---|---|---|---|---|---|
|  | Flux before* | Flux after | % weight change | Flux before* | Flux after | % weight change | Flux before* | Flux after | % weight change |
| 1A | 22,500 | 19,500 | nil | 24,500 | 22,500 | 2.3 | 24,500 | 23,000 | 6.6 |
| 1B | 23,000 | 19,500 | nil | 23,000 | 19,500 | 1.5 | 21,500 | 19,500 | 6.9 |
| 1C | 23,000 | 20,000 | 1 | 23,000 | 19,000 | 1.9 | 22,500 | 20,500 | 4.4 |

*These values are fluxes measured after drying and rewetting the original composite materials When kept in water for 40 days the water fluxes of the samples were found to decline slightly from its original value. The weight changes of the samples were within experimental errors indicating that there was no loss of any coated materials on storage in water. There is also a similar trend of flux decline in case of treatments with acid or alkaline solutions. The mass change in case of 1N HCl is in some cases up to 2.3% which seems above the experimental error and hence real. There is a higher mass loss in case of treatment of the composite materials in alkaline solutions indicating that there is a significant decay of the coated materials in strong alkaline environments for longer time.

There are two opposing effects observable in these data. When there is apparently a real weight loss in most of the cases, other than treatment in water, there is a simultaneous decline in water flux upon the treatments in all the cases. This trend indicates that the coated materials gel decayed in certain cases upon the treatments resulting in the mass loss. At the same time the coated materials swell during the treatments resulting in the loss of fluxes of the composite materials. Because of these two opposing factors regularity in trend of flux decline was not observed in some cases. The composite materials in the case of treatment in water and HCl retain their instant wettabilities, but in the case of treatment with 1N NaOH the wettability becomes poorer than the original composite materials. The weight losses during HCl treatment do not significantly affect the wettability of the composite materials.

Example 9

This example describes the effect of free chlorine on coated composite materials.

Pore coated composite materials were prepared following the procedure described in Example 6. The samples were kept immersed in 225 ppm NaOCl solution for 20 hrs at room temperature. The changes in properties of the composite materials were determined after that as described in Experimental part. Certain amount of discoloration of the samples was observed after the treatment. However no floating material was found in the treatment bath.

The composite materials, which were wettable instantly before the treatment, took 15-30 seconds for complete wetting after the treatment.

The data of coated composite materials treated with 225 ppm aqueous NaOCl for 20 hrs at room temperature is presented in the Table 11.

TABLE 11

Effect of free chlorine on composite material property

| Composite material (composition type) | Flux before treatment* (kg/m$^2$/hr) | Flux after treatment (kg/m$^2$/hr) | % weight change on treatment |
|---|---|---|---|
| 1A | 22,500 ± 200 | 23,500 ± 210 | 2.9 |
| 1B | 24,500 ± 220 | 25,000 ± 220 | 2.2 |
| 1C | 20,000 ± 180 | 21,500 ± 200 | 2.5 |

*These values are fluxes measured after drying and rewetting the original samples.

There was a measurable mass loss of all the composite materials following the treatment. The mass loss is also accompanied by a corresponding increase in fluxes of the composite materials. This indicates that the coated composite materials are susceptible to the presence of chlorine in its environment. Certain amount of discoloration of some samples was also observed at the end of the treatment. However there were no floating materials on the treatment bath. The composite materials, which were wetting immediately in water, took 15-30 seconds for complete wetting after the treatment with chlorine.

Example 10

This example describes coated composite materials containing positively charged quaternary ammonium groups according to invention First layer of coating was obtained as described in Example 6.

Second Layer of Coating

A 10 wt-% solution of poly(ethyleneimine) (PEI) was prepared using methanol-water (70:30 vol/vol) as a solvent. 10% (mol/mol) glycidyl methacrylate (GMA) was added and the reaction was allowed to take place at room temperature for 1 hr. To this functionalized poly(ethyleneimine) solution, monomers containing vinyl groups were added. Diallyldimethylammonium chloride (DADMAC), (3-acrylamidopropane)trimethylammonium chloride (APTAC) or 3 (methacryloylamino)propyl-trimethyl ammonium chloride (MAPTAC) was added, one monomer in each, in separate compositions. No additional cross-linker was added. A 1 w-% IRGACURE as a photoinitiator was introduced to the solution. The dry sample coated with the first layer (SPEEK) was kept between two polyethylene sheets, and the poly(ethyleneimine) solution described above was applied. The sample was then run between two rubber rollers to press the solution into the pores of the sample and to remove the excess solution. The sample was sealed properly, without allowing any solvent evaporation, and then irradiated under a UV lamp at 365 nm. After 15 min of irradiation (uniformly on each side) the sample was removed and immersed in deionised water for 2 hrs to allow the unreacted chemicals to diffuse out of the composite material. After irradiation, the composite material becomes yellow in colour. The water fluxes of as formed composite materials were measured at 100 kPa. Then the samples were dried, and their weights recorded and ion-exchange capacity of the composite materials was determined as described in Experimental part. The reproducibility of ion-exchange capacity measurements was ±3%.

The results obtained are listed in the Table 12.

TABLE 12

Effect of polymer/monomer composition on composite material properties

| No. | Monomers used | Mole ratio Of GMA to monomer | Total mass gain (%) | Water Flux (kg/m$^2$hr) | IEC (mmol/g$_{dry\ sample}$) |
|---|---|---|---|---|---|
| 1 | DADMAC | 1:2 | 48.3 ± 0.3 | 11,500 ± 100 | 0.08 |
| 2 | APTAC | 1:1 | 64.7 ± 0.5 | 9,400 ± 90 | 0.15 |
| 3 | MAPTAC | 1:1 | 54.9 ± 0.4 | 11,500 ± 100 | 0.16 |
| 4 | MAPTAC | 1:2 | 63.9 ± 0.5 | 5,200 ± 50 | 0.26 |

The composite materials were instantly wettable.

Example 11

This example gives the static protein adsorption of the composite materials.

Pore coated composite materials were prepared following the procedure described in comparative Example 2 and inventive Examples 1, 2, 3, 6 and 10. One sample of each type of the composite material was kept immersed in a BSA (1 g/L) and lysozyme (1 g/L) for 24 hrs at room temperature. The adsorption of protein was calculated by determining the protein concentration in the solution, before and after treatment, using an UV spectrophotometer.

TABLE 13

Static protein adsorption of composite materials

| Example No. | Composite material (composition type) | Composite material capacity (mg/ml) BSA | Composite material capacity (mg/ml) Lysozyme | Lysozyme recovery % | BSA recovery % |
|---|---|---|---|---|---|
| Comparative Ex. B | EVAL | 2.7 | 1.1 | — | — |
| 1 | EVAL-SO$_3$H | 3.6 | 31.8 | 85.0 | — |
| 2 | EVAL-COOH | 2.5 | 35.9 | 86.0 | — |
| 3 | EVAL-PVA | 0.5 | 0.3 | — | — |
| 6 | 1A | 8.3 | 0.80 | — | — |
|   | 1B | 11.0 | 0.17 | — | — |
|   | 1C | 24.0 | 4.8 | — | 67.0 |
| 10 | 1 | 19.0 | 5.9 | — | 71.1 |
|   | 2 | 19.7 | 4.2 | — | 53.0 |

Example 12

This example describes the preparation of a positively charged composite material similar to that of Example 6, except that the first layer is formed by polymer precipitation.

First Layer of Coating

The solution was prepared by mixing 1 g of 20 wt-% sulfonated poly(ether-ether-ketone) (SPEEK) (IEC=1.5 mmol/$g_{dry}$) in N,N-dimethylacetamide (DMAc) and 5 g of 2.5% EVAL (27 mole % ethylene content) in DMAc. The microporous substrate was placed on a polyethylene sheet. Thereafter, the solution was spread evenly over it. The substrate was subsequently covered with another polyethylene sheet and the sandwich was run between two rubber rollers to press the polymer solution into the pores and remove excess of solution. The filled substrate was placed in a water bath, maintained at 60° C., for 20 min to precipitate the polymer solution inside the sample. Thereafter, the sample was fixed on a glass plate and dried at 75° C. for 30 minutes.

Second Layer of Coating

A 10 wt-% solution of poly(ethyleneimine)(PEI) was prepared using methanol-water (70:30 vol/vol) as a solvent. A 10% (mol/mol) glycidyl methacrylate was added to this and the reaction was allowed to take place at room temperature for 1 hr. To 14 g of functionalized poly(ethyleneimine) solution In Example 2A, 4 g of 1-vinyl-2-pyrrolidinone (VP) was added, in Example 2B 1.8 g of N,N'-methylenebisacrylamide was added, and in Example 2C both 5 g of 3(methacryloylamino)propyltrimethyl ammonium chloride (MAPTAC) and 0.8 g of N,N'-methylenebisacrylamide (MBAA) were added. Photoinitiator Irgacure (1 wt-% of the total monomer) was added to each composition. The dry sample coated with the first layer (EVAL-SPEEK) was kept between two polyethylene sheets, and the PEI solution described above was applied to it. The sample was then run between two rubber rollers to press the solution into the pores of the support member and to remove the excess solution. The sample was sealed without allowing any solvent evaporation and then irradiated under a UV lamp at 365 nm. After 3-15 min of irradiation (uniformly on both sides) the sample was removed and put in deionised water for 2 hrs to allow all unreacted chemicals to diffuse out of the composite material. After irradiation, some of the composite materials become light yellow in colour. The water flux of the sample was measured and it was then dried and its weight recorded.

Thereafter, the water flux of as formed composite materials was measured, then samples were dried and their mass gain recorded. Then the wetting time of the samples was recorded by placing the dry samples horizontally on the surface of water.

TABLE 14

Properties of positively charged coated composite materials

| Composite material (composition type) | Total mass gain (%) | Water Flux (kg/m²/hr) | Wetting time (min) |
|---|---|---|---|
| 2A | 13.7 ± 0.1 | 12,000 ± 110 | 6 |
| 2B | 12.9 ± 0.1 | 11,000 ± 100 | 6 |
| 2C | 12.1 ± 0.1 | 12,500 ± 120 | 0.33 |

Example 13

This example describes the preparation of a positively charged composite material similar to that of Example 12, except that the first layer comprises poly(vinyl alcohol-co-ethylene) (EVAL) instead of a mixture of EVAL and sulfonated poly(ether-ether-ketone) (SPEEK).

First Layer of Coating

A 2.5 wt-% solution was prepared by dissolving poly(vinyl alcohol-co-ethylene) (EVAL) in N,N-dimethylacetamide at 70° C. overnight. The microporous poly(propylene) support member was placed on a polyethylene sheet, and the EVAL solution was spread evenly over it. The substrate was subsequently covered with another polyethylene sheet and the sandwich was run between two rubber rollers to press the polymer solution into the pores and remove excess of solution. The filled substrate was immersed in the water bath to precipitate the polymer. Then the sample was framed and dried in an oven at 75° C. for 30 min.

Second Layer of Coating

The solutions for second layer of coating were prepared according to the procedure given in Example 12. The coated composite materials were also prepared according to the procedure described in Example 12.

The water flux of the sample was measured at 100 kPa applied pressure and then it was dried and its weight was recorded as described in Experimental part.

TABLE 15

Properties of positively charged coated composite materials

| Composite material (composition type) | Total mass gain (%) | Water Flux (kg/m²/hr) |
|---|---|---|
| 2A | 18.9 ± 0.2 | 12,500 ± 120 |
| 2B | 22.1 ± 0.2 | 9,000 ± 90 |
| 2C | 17.5 ± 0.15 | 10,500 ± 100 |

All samples were instantly wettable.

All publications, patents and patent applications cited in this specification are herein incorporated by reference as if each individual publication, patent or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

It must be noted that as used in this specification and the appended claims, the singular forms "a", "an", and "the" include plural reference unless the context clearly dictates otherwise. Unless defined otherwise all technical and scientific terms used herein have the same meaning as commonly understood to one of ordinary skill in the art to which this invention belongs.

The invention claimed is:

1. A composite material comprising
   a) a support member having a first major surface and a second major surface, a plurality of pores extending from said first major surface to said second major surface,
   b) a first polymer layer which dumbly coats the walls of the pores of the support member, the first polymer layer having both hydrophobic and hydrophilic properties, and
   c) a second polymer layer which durably coats the surface of the first polymer layer, the second polymer being more hydrophilic than the first polymer layer, wherein the first polymer layer comprises a gel polymer.

2. A composite material according to claim 1, wherein the gel polymer is substantially water-insoluble but water swellable.

3. A composite material according to claim 1, wherein the gel polymer has an affinity parameter $d_0(H_2O)$ of from about 12 to about 40.

4. A composite material according to claim 1, wherein the gel polymer has an affinity parameter $d_0(H_2O)$ of from about 12 to about 25.

5. A composite material according to claim 1, wherein the first polymer layer comprises a non-crosslinked polymer.

6. A composite material according to claim 1, wherein the first polymer layer comprises a crosslinked polymer.

7. A composite material according to claim 1, wherein the gel polymer is a cellulose derivative, a polyester, a polyamide, a polyacrylate, poly(ethylene-co-vinyl alcohol) (EVAL), poly(ethylene-co-allyl alcohol), polyhydroxystyrene (poly(4-vinylphenol), poly(vinyl alcohol) 40% hydrolyzed (Mowiol 40-88), a partially charged polymer, a copolymer of neutral and charged monomers or a random copolymer of hydrophilic and hydrophobic monomers.

8. A composite material according to claim 7, wherein the gel polymer is a cellulose derivative selected from the group consisting of cellulose acetate, cellulose acetate butyrate, cellulose acetate propionate, 2-hydroxyethyl cellulose and ethyl cellulose.

9. A composite material according to claim 8, wherein the gel polymer is cellulose acetate having a degree of acetylation of from about 29 to about 61%.

10. A composite material according to claim 7, wherein the gel polymer is a polyester selected from the group consisting of poly(ethylene adipate), polyethylene glycol terephthalate, poly(L-lactide), poly(DL-lactide) and poly(DL-lactide-co-glycolide).

11. A composite material according to claim 7, wherein the gel polymer is a polyamide selected from the group consisting of poly(hexamethyleneadipamide) (Nylon 6/6) and poly(hexamethylenesebacamide) (Nylon 6/10).

12. A composite material according to claim 8, wherein the gel polymer is a polyacrylate selected from the group consisting of poly(2-hydroxyethyl methacrylate) and poly(2-hydroxypropyl methacrylate).

13. A composite material according to claim 7, wherein the gel polymer is poly(ethylene-co-vinyl alcohol) having an ethylene content of from about 27 to about 44 mol-%.

14. A composite material according to claim 7, wherein the gel polymer is a partially charged polymer selected from the group consisting of sulfonated poly(ether-ether-ketone) (S-PEEK; <86% sulfonation), sulfonated poly(phenylene oxide) (S-PPO; <70% sulfonation), sulfonated polysulfone (S-PS; <70% sulfonation), sulfonated poly(ether sutfone) (SPES; <70% sulfonation), sulfonated polystyrene (SPSt <70% sulfonation), aminated polysulfone (<70% amination), aminated poly(phenylene oxide) (Q-PPO; <70% amination), aminated poly(vinylbenzyl chloride) (APVB; <70% amination), partially protonated or alkylated poly(4-vinylpyridine) (Q-P4VP; <30% protonation or alkylation).

15. A composite material according to claim 14, wherein the gel polymer is a sulfonated poly(phenylene oxide).

16. A composite material according to claim 7, wherein the gel polymer is a copolymer of neutral and charged monomers that is a poly(ethylene-co-acrylic acid) copolymer.

17. A composite material according to claim 7, wherein the gel polymer is a random copolymer of one or more hydrophiic monomers and one or more hydrophobic monomers.

18. A composite material according to claim 17, wherein the one or more hydrophobic monomers are selected from the group consisting of n-hexyl acrylate, n-heptyl methacrylate, 1-hexadecyl methacrylate, methyl methacrylate, styrene, 2,3, or 4-methylstyrene, n-myristyl acrylate, N-tert-butylacrylamide, N-(n-octadecyl)acrylamide, N-tert-octylacrylamide, n-octyl methacrylate, n-propyl aerylate, iso-propyl methacrylate, n-propyl methacrylate, stearyl acrylate, 3,3,5-trimethylcyclohexyl methacrylate, undecyl acrylate, undecyl methacrylate, vinyl butyrate, vinyl laurate, vinyl octadecylether, vinyl iso-octyl ether, vinyl stearate, tert-amyl methacrylate, N-benzylmethacrylamide, iso, sec, tert or n-butyl(meth)acrylate, N-cyclohexylacrylamide, cyclohexyl (meth)acrylate, n- or iso-decyl (meth)acrylate, di(n-butyl) itaconate, N-diphenylmethylacrylamide, N-dodecylmethacrylamide, n-dodecyl methacrylate, 2-ethylbutyl methacrylate, 2-ethylhexyl acrylate, N-ethylmethacrylamide, isooctyl acrylate, isotridecylacrylate, and isobornyl acrylate.

19. A composite material according to claim 17, wherein the one or more hydrophilic monomers comprise negatively charged monomers.

20. A composite material according to claim 19, wherein the one or more hydrophilic monomers comprise negatively charged monomers selected from the group consisting of 2-acrylamido-2-methylpropanesulfonic acid, sodium sulfnonate, vinylsulfonic acid, acrylamidoglycolic acid, methacrylic acid, acrylic acid, itaconic acid, 2-propene-s-sulfonic acid, sodium acrylate,2-sulfonethyl methacrylate, 3-sulfopropyl acrylate, 3-sulfopropyl methacrylate, vinylbenzoic acid, vinylsulfonic acid, and 2-carboxyethyl acrylate.

21. A composite material according to claim 17, wherein the one or more hydrophilic monomers comprise positively charged monomers.

22. A composite material according to claim 21, wherein the one or more hydrophilic monomers comprise positively charged monomers selected from the group consisting of methacrylamidopropyltrimethylammonium chloride (MAPTAC),acrylamidopropyltrimethylammonium chloride (APTAC), 2-methacryloxyethyltrimethylammonium chloride, methacryloylcholine methyl sulphate, 2-N-morpholinoethyl acrylate, 2-N-morpholinoethyl methacrylate, 1-vinylimidazole, 2, or 4-vinylpyridine, 2-acryloxyethyltrimethylammonium chloride, 2-aminoethyl methacrylate hydrochloride, N-(3-aminopropyl)methacrylamide hydrochloride, 2-(tert -butylamino)ethyl methacrylate, diallylamine, diallyldimethylammonium chloride, 2-(N,N-diethylamino)ethyl methacrylate, 2-(diethylamino)ethylstyrene, 2-(N,N-dimethylamino)ethyl acrylate, N-[2-(N,N-dimethylamino) ethyl] methacrylamide, 2-(N,N-dimethylamino)ethyl methacrylate, and N-[3-(N,N-dimethylamino)propyl](meth)acrylamide.

23. A composite material according to claim 17, wherein the one or more hydrophilic monomers comprise neutral monomers.

24. A composite material according to claim 23, wherein the one or more hydrophilic monomers comprise neutral monomers selected from the group consisting of 4-hydroxybutyl methacrylate, 2-hydroxylethyl (meth)acrylate, N-(2-hydroxypropyl)methacrylamide, hydroxypropyl (meth)acrylate, (meth)acrylamide, N-methacryloylmorpholine, N-methylmethacrylamide, N-methylacrylamide, monoacryloxyethyl phosphate, 1,1,1-trimethylolpropane diallyl ether, 1,1,1-trimethylolpropane mono allyl ether, poly(ethylene glycol) monomethacrylate, poly(propylene glycol) monomethacrylate, N-isopropylacrylamide, N-vinylcaprolactam, N-vinylformamide, vinyl-4-hydroxybutylether, N-vinyl-N-methacetamide, vinyl methylsulfone, N-vinyl-2-pyrrolidone, N-vinylurea, acrylamide, N-acryloylmorpholine, N-acryloyltri(hydroxymethyl)methylamine, diethylacrylamide, N,N-diethylmethacrylamide, N,N-dimethylacrylamide, N,N-dimethylmethacrylamide, glycerol monoacrylate, glycerol monomethacrylate, 2-(2-ethoxyethoxy)ethyl acrylate, and tetrahydrofurfuryl acrylate.

25. A composite material according to claim 17, wherein the random copolymer further comprises one or more reactive monomers.

26. A composite material according to claim 25, wherein the one or more reactive monomers are selected from the group consisting of methacrylic anhydride, vinyl azlactone, acrylic anhydride, allyl glycidyl ether, allylsuccinic anhydride, 2-cinnamoyloxyethyl acrylate, cinnamyl methacrylate, citraconic anhydride, and glycidyl acrylate.

27. A composite material according to claim 17, wherein the random copolymer of hydrophilic and hydrophobic monomers is selected from the group consisting of poly(2-acrylamido-2-methylpropanesulfonic acid-co-N-t-butylacrylamide), poly (N-vinylformamide-co-N-t-butylacrylamide), poly(2-acrylamidopropane-trimethyl ammonium chloride-co-N-t-butylacrylamide), poly(methacrylamidopropane-trimethylammonium chloride-co-N-t-butylacrylamide), poly(2-acrylamido-2-methylpropanesulfonic acid-co-methylmethacylate) poly(N-vinylformamide-co-co-methylmethacylate), poly(2-acrylamidopropane-trimethyl ammonium chloride-co-methylmethacylate) and poly(methacrylamidopropane-trimethylammonium chloride-co-methylmethacylate).

28. A composite material according to claim 1, wherein the second polymer layer comprises a crosslinked gel polymer.

29. A composite material according to claim 1, wherein the second polymer layer comprises a monomer or polymer selected from the group consisting of ethyleneimine, 4-styrenesulfonic acid, vinyl alcohol, acrylic acid, diallyldimethylammonium chloride, acrylamide and vinylpyrrolidone, 2-acryloxyethyltrimethylammonium chloride, N-acryloyltris (hydroxymethyl)methylamine, 2-aminoethyl methacrylate hydrochloride, N-(3-aminopropyl)methacrylamide hydrochloride, N,N-diethylacrylamide, N,N-dimethylacrylamide, 2-(N,N-dimethylamino)ethyl acrylate and methacrylate, N-[3-(N,N-dimethylamino)propyl]methacrylamide, N,N-dimethylacrylamide, n-dodecyl acrylate, n-dodecyl methacrylate, 2-(2-ethoxyethoxy)ethyl acrylate and methacrylate, 2,3-dihydroxypropyl acrylate and methacrylate, glycidyl acrylate and methacrylate, n-heptyl acrylate and methacrylate, 1-hexadecyl acrylate and methacrylate, 2-hydroxyethyl acrylate and methacrylate, N-(2-hydroxypropyl)methacrylamide, hydroxypropyl acrylate and methacrylate, methacrylamide, methacrylic anhydride, methacryloxyethyltrimethylammonium chloride, 2-(2-methoxy)ethyl acrylate and methacrylate, N-iso-propylacrylamide, 4-vinylpyridine, vinylsulfonic acid, N-vinyl-2-pyrrolidone,poly(ethyleneimine) (PEI), poly(4-styrenesulfonic acid), poly(vinyl alcohol) (PVA), poly(acrylic acid) (PAA), poly(diallyldimethylammonium chloride) (PDADMAC), polyacrylamide (PAcAm) and polyvinylpyrrolidone (PVPR).

30. A composite material according to claim 1, wherein the second polymer layer is covalently bonded to the first polymer layer.

31. A composite material according to claim 1, wherein the polymer forming the first layer has a molecular weight of from about 5,000 to about 500,000 g/mol.

32. A composite material according to claim 1, wherein the polymer forming the second polymer layer has a molecular weight of from about 5,000 to about 500,000 g/mol.

33. A composite material according to claim 1, wherein the support member has pores having an average pore size of from 0.1 to 30 µm, and a volume porosity of from 60 to 90%.

34. A composite material according to claim 1, wherein the support member is in the form of a flat sheet, a hollow tube fibre, or a tubular membrane.

35. A composite material according to claim 1, wherein the support member is in the form of a flat sheet having a thickness of from 10 to 1000 µm.

36. A composite material according to claim 1, comprising at least one additional polymer layer, each additional layer durably coating a previously deposited polymer layer.

* * * * *

UNITED STATES PATENT AND TRADEMARK OFFICE
CERTIFICATE OF CORRECTION

| | |
|---|---|
| PATENT NO. | : 7,883,767 B2 |
| APPLICATION NO. | : 11/238642 |
| DATED | : February 8, 2011 |
| INVENTOR(S) | : Ronald F. Childs et al. |

Page 1 of 1

It is certified that error appears in the above-identified patent and that said Letters Patent is hereby corrected as shown below:

<u>Column 31</u> line 65 "poly(ether sutfone)" should be "poly(ether sulfone)".

<u>Column 32</u> line 11 "hydrophiic" should be "hydrophilic".

<u>Column 32</u> line 19 "aerylate" should be "acrylate".

Signed and Sealed this
Nineteenth Day of April, 2011

David J. Kappos
*Director of the United States Patent and Trademark Office*